(12) United States Patent
Terashima et al.

(10) Patent No.: US 10,674,172 B2
(45) Date of Patent: Jun. 2, 2020

(54) IMAGE PROCESSING APPARATUS, IMAGE PROCESSING METHOD, AND COMPUTER-READABLE RECORDING MEDIUM

(71) Applicant: MITSUBISHI ELECTRIC CORPORATION, Tokyo (JP)

(72) Inventors: Hideaki Terashima, Tokyo (JP); Yasunori Tsubaki, Tokyo (JP); Hiroshi Yoshida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 46 days.

(21) Appl. No.: 16/080,164

(22) PCT Filed: Apr. 19, 2016

(86) PCT No.: PCT/JP2016/062370
§ 371 (c)(1),
(2) Date: Aug. 27, 2018

(87) PCT Pub. No.: WO2017/183109
PCT Pub. Date: Oct. 26, 2017

(65) Prior Publication Data
US 2019/0052893 A1 Feb. 14, 2019

(51) Int. Cl.
*H04N 19/507* (2014.01)
*H04N 19/132* (2014.01)
(Continued)

(52) U.S. Cl.
CPC ......... *H04N 19/507* (2014.11); *H04N 19/132* (2014.11); *H04N 19/137* (2014.11);
(Continued)

(58) Field of Classification Search
CPC .... H04N 19/507; H04N 19/176; H04N 19/15; H04N 21/21815; H04N 19/132;
(Continued)

(56) References Cited

U.S. PATENT DOCUMENTS 6,259,736 B1   7/2001   Chujoh et al.
6,549,236 B2   4/2003   Oeda et al.
(Continued)

FOREIGN PATENT DOCUMENTS

JP   6-105303 A    4/1994
JP   11-41609 A    2/1999
(Continued)

OTHER PUBLICATIONS

International Search Report, issued in PCT/JP2016/060202, PCT/ISA/210, dated Jun. 21, 2016.
(Continued)

*Primary Examiner* — Nimesh Patel
(74) *Attorney, Agent, or Firm* — Birch, Stewart, Kolasch & Birch, LLP

(57) ABSTRACT

A difference detecting unit (130) compares a captured image (811) divided into a plurality of blocks with a last captured image (812) to be compared with the captured image (811), on a block-by-block basis to detect blocks having differences from the last captured image (812), as differential blocks. In addition, a differential block selecting unit (140) selects one or more difference transmission scheduled blocks to be encoded and transmitted, from the differential blocks. In addition, a cyclic block selecting unit (160) selects one or more cyclic transmission scheduled blocks to be encoded and transmitted, from cyclic blocks other than the one or more difference transmission scheduled blocks among the plurality of blocks. A total value of amounts of code used to encode the respective one or more cyclic
(Continued)

transmission scheduled blocks is in a range of a lower limit value and an upper limit value.

12 Claims, 19 Drawing Sheets

(51) Int. Cl.
| | |
|---|---|
| H04N 21/218 | (2011.01) |
| H04N 19/15 | (2014.01) |
| H04N 19/176 | (2014.01) |
| H04N 21/226 | (2011.01) |
| H04N 19/137 | (2014.01) |
| H04N 19/61 | (2014.01) |

(52) U.S. Cl.
CPC ........... *H04N 19/15* (2014.11); *H04N 19/176* (2014.11); *H04N 19/61* (2014.11); *H04N 21/21815* (2013.01); *H04N 21/226* (2013.01)

(58) Field of Classification Search
CPC .... H04N 19/61; H04N 19/137; H04N 21/226; H04N 19/91; H04N 19/124; H04N 19/50; H04N 19/174; H04N 19/593; H04N 19/46; H04N 19/66; H04N 13/161; H04N 19/147; H04N 19/90; H04N 13/122; H04N 19/126; H04N 19/103; H04N 19/149; H04N 19/115; H04N 19/14; H04N 19/70; H04N 19/172; H04N 19/136; H04N 19/523; H04N 11/042; H04N 19/463; H04N 13/194; H04N 13/239; H04N 19/16; H04N 21/6125; H04N 21/6587; H04N 19/107; H04N 21/2343; H04N 19/436; H04N 19/146; H04N 19/169; H04N 21/658; H04N 21/23; H04N 21/6405; H04N 21/21; H04N 19/166; H04N 21/234363; H04N 19/587; H04N 19/17; H04N 7/15; H04N 21/6336; H04N 21/6379; H04N 19/13; H04N 19/196; H04N 19/197; H04N 19/198; H03M 7/42; H03M 7/40; H03M 7/30; H03M 13/23; H03M 13/271; H03M 13/2732; H03M 13/276; H03M 13/2789; H03M 1/00; H03M 7/3082; H03M 1/001; H03M 1/124; H03M 3/02; H03M 7/3044; H03M 7/3053; H03M 7/4006; G06T 9/005; G06T 9/007; G06T 2207/10016; G06T 9/004; G06T 7/254; G06T 5/50; G06T 7/12; G06T 7/174; G06T 7/215; G06T 7/223; G06T 7/521; G06T 9/00; G06T 9/001; G06T 9/008; G06T 2210/36; G06T 3/40; G06T 3/4053; G06T 5/003; G06T 2207/10024; G06T 2207/20021; G06T 2207/30168; G06T 5/002; G06T 7/0002; G06T 7/207; G06T 7/248; G06T 9/002; G06T 7/238; G06T 9/20; G06T 15/20; G06T 19/00; G06T 1/00; G06T 2200/16; A61B 5/0042; A61B 2576/026; A61B 5/0263; A61B 5/055; A61B 5/4547; A61B 5/0022; A61B 5/11; A61B 5/1128; A61B 5/14532; A61B 5/4064; A61B 5/4833; A61B 5/486; A61B 5/7282; A61B 5/742; A61B 5/7475; A61B 1/00186; A61B 1/042; A61B 1/043; A61B 1/05; G06K 15/1865; G06K 9/00369; G06K 9/36; G06K 9/6255; G06K 13/0825; G06K 7/015; G06K 7/10851; G06K 9/00402; G06K 9/2036; G06K 9/32; G06K 9/344; G06K 9/4642; G06K 9/74; G06K 7/10722; G06K 7/0166; G06K 9/4652; G06K 9/4661; G06K 16/289; G06K 16/40; G06K 3/00; G06K 7/02; G01S 13/87; G01S 13/89; G01S 7/024; G01S 7/41; G01S 7/411; G01S 7/414; G01S 7/42; G01S 7/4817; G01S 7/52063; G06F 11/1675; G06F 16/289; G06F 16/40; G06F 16/51; G06F 16/583; G06F 19/3456; G06F 3/00; G06F 7/02; G06F 21/6218; G06F 2221/0724; G06F 16/00; G06F 16/9535; G06F 3/0321; G06F 3/04886; H04L 63/0435; H04L 63/0442; H04L 63/061; H04L 63/0823; H04L 63/0861; H04L 65/60; H04L 9/0891; H04L 9/14; H04L 67/42; H04L 47/38; H04L 1/0045; H04L 1/1854; H04L 29/06027; H04L 9/088; H04L 9/12; H04L 1/1838; H04L 27/26; H04L 65/607; H04L 65/605; H04L 65/4076; H04L 65/403; H04L 65/608; H04L 65/80; H04L 65/4007; H04L 47/283; H04L 67/025; H04L 47/25; H04L 65/00; H04L 65/4084; H04L 65/601; H04L 67/1097; H04L 67/2861; H04L 67/36; H04L 12/1813; H04L 12/1822; H04W 4/80; H04W 84/12; H04W 88/02; H04W 16/14; H04W 72/0406; H04W 74/04; H04W 74/08; H04W 28/06; H04W 4/00; H04W 4/06; H04W 48/08; H04W 48/16; H04W 8/24; G10L 19/0212; G10L 19/00; G02B 2027/014; G02B 2027/0187; G02B 27/017; A63F 2300/552; A63F 13/335; A63F 13/355; A63F 2300/402; A63F 2300/407; A63F 13/30; A63F 2300/534; A63F 2300/535; A63F 2300/69; A63F 13/338; A63F 13/525; A63F 2300/5593; H04M 3/567; H04M 2201/22; H04M 7/006; H04M 9/08

See application file for complete search history.

(56) References Cited

U.S. PATENT DOCUMENTS

| | | | |
|---|---|---|---|
| 7,031,386 B2 * | 4/2006 | Yamamoto | H04N 5/4401 348/E5.108 |
| 7,573,462 B2 | 8/2009 | Ouchi | |
| 7,869,503 B2 * | 1/2011 | Haskell | H04N 19/159 375/240.01 |
| 8,482,480 B2 | 7/2013 | Kim et al. | |
| 9,519,373 B2 | 12/2016 | Nakamura | |
| 10,390,076 B2 * | 8/2019 | Yoshida | H04L 65/607 |
| 2002/0154703 A1 | 10/2002 | Kubota et al. | |
| 2004/0027482 A1 | 2/2004 | Lee et al. | |
| 2008/0240585 A1 * | 10/2008 | Imajo | H04N 19/176 382/232 |
| 2009/0015513 A1 | 1/2009 | Kim et al. | |
| 2009/0147130 A1 | 6/2009 | Kim | |
| 2010/0080478 A1 | 4/2010 | Satou et al. | |
| 2010/0097379 A1 | 4/2010 | Choi | |
| 2010/0111491 A1 | 5/2010 | Kamoto | |
| 2010/0134384 A1 | 6/2010 | Kim et al. | |
| 2010/0303153 A1 | 12/2010 | Kadono | |
| 2011/0109526 A1 | 5/2011 | Bauza et al. | |
| 2011/0229106 A1 | 9/2011 | Cho | |
| 2012/0275518 A1 | 11/2012 | Kadono et al. | |
| 2012/0308151 A1 | 12/2012 | Tatsuka et al. | |

(56) References Cited

U.S. PATENT DOCUMENTS

| | | | |
|---|---|---|---|
| 2013/0251257 A1* | 9/2013 | Ohnishi | G06T 9/00 |
| | | | 382/166 |
| 2014/0079120 A1 | 3/2014 | Hiraoka et al. | |
| 2015/0350595 A1* | 12/2015 | Chen | H04N 7/0155 |
| | | | 348/724 |
| 2015/0365703 A1* | 12/2015 | Puri | H04N 19/176 |
| | | | 375/240.24 |
| 2016/0057508 A1 | 2/2016 | Borcherdt | |
| 2017/0255304 A1 | 9/2017 | Lee et al. | |
| 2018/0268782 A1 | 9/2018 | Kaneko | |
| 2018/0359515 A1 | 12/2018 | Lee et al. | |

FOREIGN PATENT DOCUMENTS

| | | |
|---|---|---|
| JP | 11-220733 A | 8/1999 |
| JP | 2001-359102 A | 12/2001 |
| JP | 2003-209828 A | 7/2003 |
| JP | 2005-301131 A | 10/2005 |
| JP | 2007-300455 A | 11/2007 |
| JP | 2008-244993 A | 10/2008 |
| JP | 2009-212821 A | 9/2009 |
| JP | 2010-103985 A | 5/2010 |
| JP | 2010-136220 A | 6/2010 |
| JP | 2010-206753 A | 9/2010 |
| JP | 2010-233263 A | 10/2010 |
| JP | 2011-166512 A | 8/2011 |
| JP | 2011-233991 A | 11/2011 |
| JP | 2012-23765 A | 2/2012 |
| JP | 2012-169739 A | 9/2012 |
| JP | 2013-106132 A | 5/2013 |
| JP | 2014-60666 A | 4/2014 |
| JP | 2015-170078 A | 9/2015 |
| WO | WO 01/056244 A1 | 8/2001 |
| WO | WO 2009/069316 A1 | 6/2009 |
| WO | WO 2011/004598 A1 | 1/2011 |

OTHER PUBLICATIONS

International Search Report, issued in PCT/JP2016/062370, PCT/ISA/210, dated Jul. 19, 2016.

Written Opinion of the International Searching Authority, issued in PCT/JP2016/062370, PCT/ISA/237, dated Jul. 19, 2016.

\* cited by examiner

IMAGE PROCESSING APPARATUS, IMAGE PROCESSING METHOD, AND COMPUTER-READABLE RECORDING MEDIUM

TECHNICAL FIELD

The present invention relates to an image processing apparatus, an image processing method, and an image processing program, and more particularly to an image processing apparatus, an image processing method, and an image processing program that perform image processing for delivery of video.

BACKGROUND ART

An image processing apparatus of Patent Literature 1 limits the amounts of code for intra-prediction and inter-prediction in turn when performing video encoding. In addition, in the image processing apparatus of Patent Literature 1, when the amount of code per picture is expected to exceed a predetermined upper limit, encoding is controlled to suppress the amount of code, by which the exceeding of the upper limit is avoided.

CITATION LIST

Patent Literature

Patent Literature 1: JP 2010-233263 A

SUMMARY OF INVENTION

Technical Problem

In Patent Literature 1, video delivery is premised on lossy compression, and thus, encoding of video having a lot of changes is handled by increasing compression rate. On the other hand, for video delivery with lossless compression, since an improvement in compression rate cannot be expected, there is a problem that the amount of code increases when there is input of video having a lot of changes.

An object of the present invention is to transmit differential blocks and cyclic blocks other than the differential blocks with an appropriate amount of code by dividing a screen into a plurality of blocks and selecting blocks to be encoded and transmitted, while going through the plurality of blocks in a cyclic manner.

Solution to Problem

An image processing apparatus according to the present invention includes:

a difference detecting unit to compare a delivered image divided into a plurality of blocks with a comparison image on a block-by-block basis to detect blocks having differences from the comparison image, as differential blocks, from the plurality of blocks, the delivered image being delivered among a plurality of images to be sequentially delivered, and the comparison image being compared with the delivered image among the plurality of images;

a differential block selecting unit to select one or more blocks to be encoded and transmitted, as one or more difference transmission scheduled blocks, from the differential blocks; and a cyclic block selecting unit to select one or more blocks to be encoded and transmitted, as one or more cyclic transmission scheduled blocks, from cyclic blocks, the cyclic blocks being blocks other than the one or more difference transmission scheduled blocks among the plurality of blocks, a total value of amounts of code used to encode the respective one or more cyclic transmission scheduled blocks being in a range of a lower limit value and an upper limit value.

Advantageous Effects of Invention

According to the image processing apparatus according to the present invention, the difference detecting unit compares a delivered image divided into a plurality blocks with a comparison image on a block-by-block basis to detect blocks having differences from the comparison image, as differential blocks, from the plurality of blocks, and the differential block selecting unit selects one or more transmission scheduled blocks to be encoded and transmitted, from the differential blocks. In addition, the cyclic block selecting unit selects one or more cyclic transmission scheduled blocks to be encoded and transmitted, from cyclic blocks which are blocks other than the differential blocks among the plurality of blocks, a total value of the amounts of code used to encode the respective one or more cyclic transmission scheduled blocks being in a range of a lower limit value and an upper limit value. Thus, there is provided an advantageous effect of being able to select, as blocks to be encoded and transmitted, differential blocks and cyclic blocks with an appropriate amount of code.

DESCRIPTION OF EMBODIMENTS

First Embodiment

Description of Configurations

Figure 1:
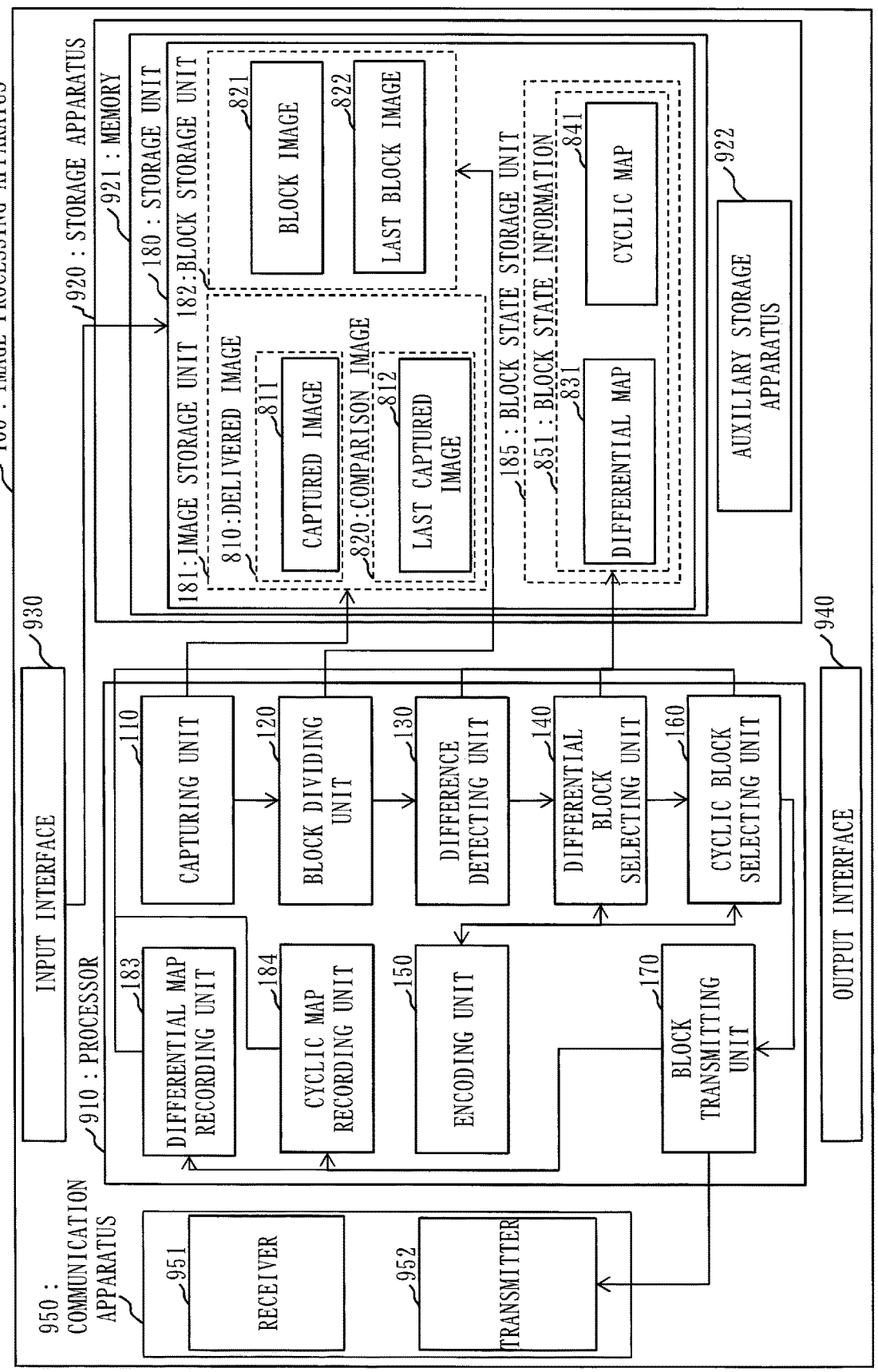
FIG. 1 is a configuration diagram of an image processing apparatus 100 according to a first embodiment.

A configuration of an image processing apparatus 100 according to the present embodiment will be described using FIG. 1.

In the present embodiment, the image processing apparatus 100 is a computer. The image processing apparatus 100 includes hardware such as a processor 910, a storage apparatus 920, an input interface 930, an output interface 940, and a communication apparatus 950. The storage apparatus 920 includes a memory 921 and an auxiliary storage apparatus 922.

The image processing apparatus 100 includes, as functional configurations, a capturing unit 110, a block dividing unit 120, a difference detecting unit 130, a differential block selecting unit 140, an encoding unit 150, a cyclic block selecting unit 160, a block transmitting unit 170, a differential map recording unit 183, a cyclic map recording unit 184, and a storage unit 180.

In the following description, the functions of the capturing unit 110, the block dividing unit 120, the difference detecting unit 130, the differential block selecting unit 140, the encoding unit 150, the cyclic block selecting unit 160, the block transmitting unit 170, the differential map recording unit 183, and the cyclic map recording unit 184 in the image processing apparatus 100 are referred to as the functions of the "units" of the image processing apparatus 100.

The functions of the "units" of the image processing apparatus 100 are implemented by software.

In addition, the storage unit 180 is implemented by the storage apparatus 920. The storage unit 180 includes an image storage unit 181 that stores a captured image 811 and a last captured image 812, and a block storage unit 182 that stores a block image 821 and a last block image 822. In addition, the storage unit 180 includes a block state storage unit 185 that stores block state information 851. The block state information 851 includes a differential map 831 and a cyclic map 841.

The processor 910 is connected to other pieces of hardware through signal lines and controls the other pieces of hardware.

The processor 910 is an integrated circuit (IC) that performs processing. The processor 910 is specifically a central processing unit (CPU), a graphics processing unit (GPU), etc.

The storage apparatus 920 includes the memory 921 and the auxiliary storage apparatus 922. The auxiliary storage apparatus 922 is specifically a read only memory (ROM), a flash memory, or a hard disk drive (HDD). The memory 921 is specifically a random access memory (RAM). In the present embodiment, the storage unit 180 is implemented by the memory 921. Note that the storage unit 180 may be implemented by the auxiliary storage apparatus 922, or may be implemented by the memory 921 and the auxiliary storage apparatus 922. A method for implementing the storage unit 180 is any.

The input interface 930 is a port connected to an input apparatus such as a mouse, a keyboard, or a touch panel. The input interface 930 is specifically a USB terminal. Note that the input interface 930 may be a port connected to a local area network (LAN).

The output interface 940 is a port to which is connected a cable of a display device such as a display apparatus. The output interface 940 is specifically a USB terminal or a high definition multimedia interface (HDMI (registered trademark)) terminal. The display apparatus is specifically a liquid crystal display (LCD). Note that the output interface 940 may be connected to an output apparatus such as a printer apparatus.

The communication apparatus 950 includes a receiver 951 and a transmitter 952. Specifically, the communication apparatus 950 is a communication chip or a network interface card (NIC). The communication apparatus 950 functions as a communication unit that communicates data. The receiver 951 is a receiving device that receives data, and the transmitter 952 is a transmitting device that transmits data.

In the auxiliary storage apparatus 922 there is stored a program that implements the functions of the "units". The program is loaded into the memory 921, read into the processor 910, and executed by the processor 910. In the auxiliary storage apparatus 922 there is also stored an operating system (OS). At least a part of the OS is loaded into the memory 921, and the processor 910 executes the program that implements the functions of the "units" while executing the OS.

The image processing apparatus 100 may include a plurality of processors which are a substitution of the processor 910. The plurality of processors share the execution of the program that implements the functions of the "units". Each processor is, as with the processor 910, an IC that performs processing.

Information, data, signal values, and variable values that indicate the results of processes performed by the functions of the "units" are stored in the memory 921, the auxiliary storage apparatus 922, or a register or a cache memory in the processor 910. Note that in FIG. 1 an arrow connecting each unit to the storage unit 180 indicates that each unit stores a result of a process in the storage unit 180, or that each unit reads information from the storage unit 180. In addition, an arrow connecting units indicates the flow of control.

The program that implements the functions of the "units" may be stored in a portable recording medium such as a magnetic disk, a flexible disk, an optical disc, a compact disc, a Blu-ray (registered trademark) Disc, or a digital versatile disc (DVD).

Note that the program that implements the functions of the "units" is also referred to as image processing program 520. The image processing program 520 is a program that implements functions described as the "units". In addition, ones that are referred to as image processing program products are a storage medium and a storage apparatus that have the image processing program 520 recorded therein, and the image processing program products are ones into which a computer readable program is loaded, irrespective of a visual form.

Description of Functional Configurations

The capturing unit 110 obtains a captured image 811 by performing capturing, and stores the captured image 811 in the storage unit 180. The captured image 811 is an example of a delivered image 810 to be delivered among a plurality of images that are sequentially delivered.

Specifically, the capturing unit 110 copies, as a captured image 811, an execution screen for an arbitrary application stored in the storage unit 180 to an area of the storage unit 180. For example, the image processing apparatus 100 includes an application executing unit that executes an application. The image processing apparatus 100 accepts user input through the input interface 930 or the receiver 951, and passes the user input to the application executed by the application executing unit. The application executing unit executes the application based on the user input, and thereby creates an application execution screen. The capturing unit 110 captures the application execution screen created by the application executing unit. The capturing unit 110 obtains timing at which capturing is performed and a capturing target, for example, by user input or by reading an external settings file.

Note that the capturing unit 110 may obtain a captured image 811 through the input interface 930 or the receiver 951.

In addition, in the image storage unit 181 there are stored the captured image 811 obtained by the capturing unit 110 and a last captured image 812 obtained last time by the capturing unit 110. The last captured image 812 is an example of a comparison image 820 to be compared with the delivered image 810.

The capturing unit 110 obtains the state of each differential block from the differential map recording unit 183 and obtains the state of each-cyclic block from the cyclic map recording unit 184, to determine whether to perform capturing.

The block dividing unit 120 divides the captured image 811 into a plurality of blocks. A division method is specified by a user or by a settings file, and division is performed once or more in a longitudinal direction and once or more in a transverse direction. In addition, division may be performed only in the longitudinal direction or only in the transverse direction.

The block dividing unit 120 stores, as a block image 821, the captured image 811 divided into blocks in the block storage unit 182.

Note that in the block storage unit 182 there are stored the block image 821 divided by the block dividing unit 120, and a last block image 822 obtained by dividing the last captured image 812 by the block dividing unit 120. The block image 821 is an example of the delivered image 810 divided into a plurality of blocks. In addition, the last block image 822 is an example of the comparison image 820 divided into a plurality of blocks.

Specifically, the block dividing unit 120 reads the captured image 811 stored in the block storage unit 182, divides the captured image 811 into a plurality of blocks using the processor 910, and re-stores the divided captured image 811 as a block image 821 in the block storage unit 182.

The difference detecting unit 130 compares the block image 821 with the last block image 822 on a block-by-block basis to detect blocks having differences from the last block image 822, as differential blocks, from the plurality of blocks. The difference detecting unit 130 issues an instruction to write a state to each block of the differential map 831, to the differential map recording unit 183 based on determination results for the respective blocks.

Specifically, the difference detecting unit 130 reads the block image 821 and the last block image 822 from the block storage unit 182, and compares the block image 821 with the last block image 822 on a pixel-by-pixel basis, using the processor 910.

The block state storage unit 185 stores block state information 851 in which the state of each of the plurality of blocks is recorded. The block state storage unit 185 includes, as the block state information 851, a differential map 831 in which the states of differential blocks which will be described later are recorded, and a cyclic map 841 in which the states of cyclic blocks which will be described later are recorded.

The differential map recording unit 183 changes the state of a specified block to a specified state in the differential map 831 stored in the block state storage unit 185. The differential map recording unit 183 receives instructions to write a state for each block from the difference detecting unit 130, the differential block selecting unit 140, and the block transmitting unit 170, and changes the state of each block of the differential map 831 based on the instructions.

Figure 2:
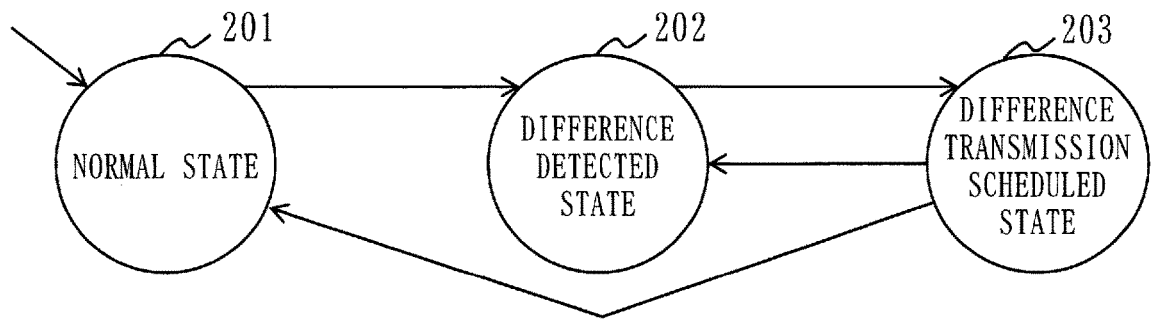
FIG. 2 is a diagram illustrating the state transitions of each block of a differential map 831 according to the first embodiment.

The state transitions of each block of the differential map 831 according to the present embodiment will be described using FIG. 2.

A normal state 201 indicates that the block has an initial value.

A difference detected state 202 indicates that the block has a difference. When the difference detecting unit 130 compares the block image 821 with the last block image 822 and thereby detects a difference in a given block, the difference detected state 202 is recorded for the block. In addition, the difference detected state 202 is also recorded for a block in a difference transmission scheduled state 203 among blocks determined by the difference detecting unit 130 to have no differences.

The difference transmission scheduled state 203 indicates that the block is scheduled to be transmitted by the block transmitting unit 170. A state transition to the difference transmission scheduled state 203 is performed according to the result of a process performed by the differential block selecting unit 140.

The normal state 201 can transition to the difference detected state 202. The difference detected state 202 can transition to the difference transmission scheduled state 203. The difference transmission scheduled state 203 can transition to the normal state 201. The difference transmission scheduled state 203 can transition to the difference detected state 202. A state transition is stored, for example, using a flag.

The differential block selecting unit 140 selects one or more blocks to be encoded and transmitted, as one or more difference transmission scheduled blocks 2031, from the differential blocks.

Specifically, the differential block selecting unit 140 obtains the block image 821 and the differential map 831. The differential block selecting unit 140 determines, for each block, whether the block is in the difference transmission scheduled state 203, based on the block image 821 and the differential map 831, while going through the block image 821 in a cyclic manner, and records difference transmission scheduled blocks 2031 that are newly set to the difference transmission scheduled state 203, in the differential map 831. Namely, the difference transmission scheduled blocks 2031 are blocks set to the difference transmission scheduled state 203 in the differential map 831. The differential block selecting unit 140 outputs processing-target blocks to the encoding unit 150, and receives encoded blocks from the encoding unit 150. The differential block selecting unit 140 selects difference transmission scheduled blocks 2031 based on the amounts of code of the encoded blocks. The differential block selecting unit 140 outputs the block image 821 and difference encoded blocks 1401 obtained by encoding the difference transmission scheduled blocks 2031 to the cyclic block selecting unit 160. Alternatively, the differential block selecting unit 140 may output the difference encoded blocks 1401 obtained by encoding the difference transmission scheduled blocks 2031 and the block image 821 excluding the portions of the difference encoded blocks 1401, to the cyclic block selecting unit 160.

The cyclic block selecting unit 160 receives the block image 821 and the encoded difference encoded blocks 1401 from the differential block selecting unit 140. The cyclic block selecting unit 160 determines, for each block, whether the block is in a cyclic transmission scheduled state 302, while going through the blocks of the block image 821 in a cyclic manner, and records blocks that are newly determined to be in the cyclic transmission scheduled state 302 (cyclic transmission scheduled blocks 3021) in the cyclic map 841.

The cyclic block selecting unit 160 selects one or more blocks to be encoded and transmitted, as one or more cyclic transmission scheduled blocks 3021, from cyclic blocks which are blocks other than the one or more difference transmission scheduled blocks 2031 among the plurality of blocks. At this time, the one or more cyclic transmission scheduled blocks 3021 are such that the total value of the amounts of code used to encode the respective one or more cyclic transmission scheduled blocks 3021 is in a range of a lower limit value Y and an upper limit value Z. The cyclic block selecting unit 160 outputs processing-target blocks to the encoding unit 150, and receives encoded blocks from the encoding unit 150. The cyclic block selecting unit 160 selects cyclic transmission scheduled blocks 3021 based on the amounts of code of the encoded blocks.

Figure 3:
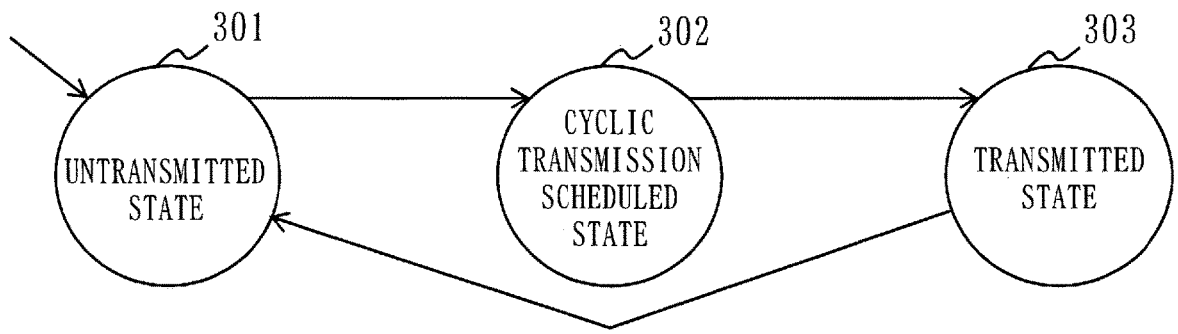
FIG. 3 is a diagram illustrating the state transitions of each block of a cyclic map 841 according to the first embodiment.

The state transitions of each block of the cyclic map 841 according to the present embodiment will be described using FIG. 3.

The cyclic map 841 is recorded on a block-by-block basis by the cyclic map recording unit 184.

An untransmitted state 301 indicates an initial value of the block.

The cyclic transmission scheduled state 302 indicates that the block is scheduled to be transmitted by the block transmitting unit 170. Namely, the state of a cyclic transmission scheduled block 3021 is the cyclic transmission scheduled state 302. The states in the cyclic map 841 change according to processing results obtained by the cyclic block selecting unit 160. A transmitted state 303 indicates that the block has been subjected to a transmission process by the block transmitting unit 170. The untransmitted state 301 can transition to the cyclic transmission scheduled state 302. In addition, the cyclic transmission scheduled state 302 can transition to the transmitted state 303. The transmitted state 303 can transition to the untransmitted state 301. A state transition is stored, for example, using a flag.

In addition, the cyclic map recording unit 184 changes the state of a specified block to a specified state in the cyclic map 841 stored in the block state storage unit 185. The cyclic map recording unit 184 receives instructions to write the state of each block to the cyclic map 841 from the cyclic block selecting unit 160 and the block transmitting unit 170, and changes the states of the corresponding blocks based on the instructions. The cyclic map recording unit 184 outputs the state of an inquired block to the cyclic block selecting unit 160 and the block transmitting unit 170.

The encoding unit 150 encodes one or more difference transmission scheduled blocks 2031 and one or more cyclic transmission scheduled blocks 3021, as one or more difference encoded blocks 1401 and one or more cyclic encoded blocks 1601. Namely, the encoding unit 150 receives unencoded blocks from the differential block selecting unit 140 and the cyclic block selecting unit 160, performs an encoding process, and returns encoded blocks. Note that the encoding unit 150 is also referred to as compressing unit. The encoding unit 150 receives uncompressed blocks from the differential block selecting unit 140 and the cyclic block selecting unit 160, performs a compression process, and returns compressed blocks. Namely, encoding includes compression.

Encoding algorithms that can be used by the encoding unit 150 include, for example, run-length encoding (RLE), zlib-run-length encoding (ZRLE), joint photographic experts group 2000 (JPEG 2000), etc. Not that the algorithms that can be used are not limited to those described above.

The block transmitting unit 170 performs a transmission process for transmitting the one or more difference encoded blocks 1401 and the one or more cyclic encoded blocks 1601 which are encoded by the encoding unit 150. The block transmitting unit 170 reads processing-target encoded blocks from the one or more difference encoded blocks 1401 and the one or more cyclic encoded blocks 1601 which are stored in the storage unit 180, based on the differential map 831 and the cyclic map 841. The block transmitting unit 170 packetizes the read, encoded blocks using the processor 910. The block transmitting unit 170 transmits the packetized, encoded blocks in units of packets through the transmitter 952.

Description of Operation

Next, an image transmission process S100 of an image processing method 510 and the image processing program 520 for the image processing apparatus 100 according to the present embodiment will be described using FIG. 4.

In the image transmission process S100, processes included between loop limits S101 are repeatedly performed.

At step S102, the capturing unit 110 determines based on the differential map 831 and the cyclic map 841 whether the differential map 831 and the cyclic map 841 have a block in the difference transmission scheduled state 203 or the cyclic transmission scheduled state 302. If there is a block in the difference transmission scheduled state 203 or the cyclic transmission scheduled state 302, the capturing unit 110 outputs an instruction to transmit the block in the difference transmission scheduled state 203 or the cyclic transmission scheduled state 302, to the block transmitting unit 170 without performing capturing.

Specifically, to determine whether to perform capturing of a screen, the capturing unit 110 inquires the differential map recording unit 183 and the cyclic map recording unit 184 about whether there is a block in a transmission scheduled state, i.e., a block whose flag for the difference transmission scheduled state 203 is on or whose flag for the cyclic transmission scheduled state 302 is on. If there is no block in a transmission scheduled state, the capturing unit 110 proceeds processing to step S103, and performs capturing of a screen and stores a captured image 811 in the image storage unit 181. If there is a block in a transmission scheduled state, the capturing unit 110 proceeds processing to a block transmission process S107. Note that the case in which there is a block in a transmission scheduled state includes, for example, a case in which a block in a transmission scheduled state remains due to a reason that during a block transmission process S107, the process is discontinued by some cause, etc.

At step S104, the block dividing unit 120 divides the captured image 811 captured by the capturing unit 110 into blocks, and stores the divided captured image 811 as a block image 821 in the block storage unit 182. The number of divisions of the captured image 811 can be specified by the user. In addition, the divided blocks are assigned block numbers, respectively, such that the block numbers do not overlap. For a method for assigning block numbers, for example, there is a method in which the numbers are assigned such that, with an upper left block being "1", the number increases by one in a row in a right direction and when reaching a right end, the number increases again by one from the leftmost block in a row immediately below.

Differential Block Selection Process S105

Next, processing proceeds to a differential block selection process S105. In the differential block selection process S105, selection and encoding of differential blocks to be transmitted are performed.

The differential block selection process S105 according to the present embodiment will be described using FIG. 5.

Figure 5:
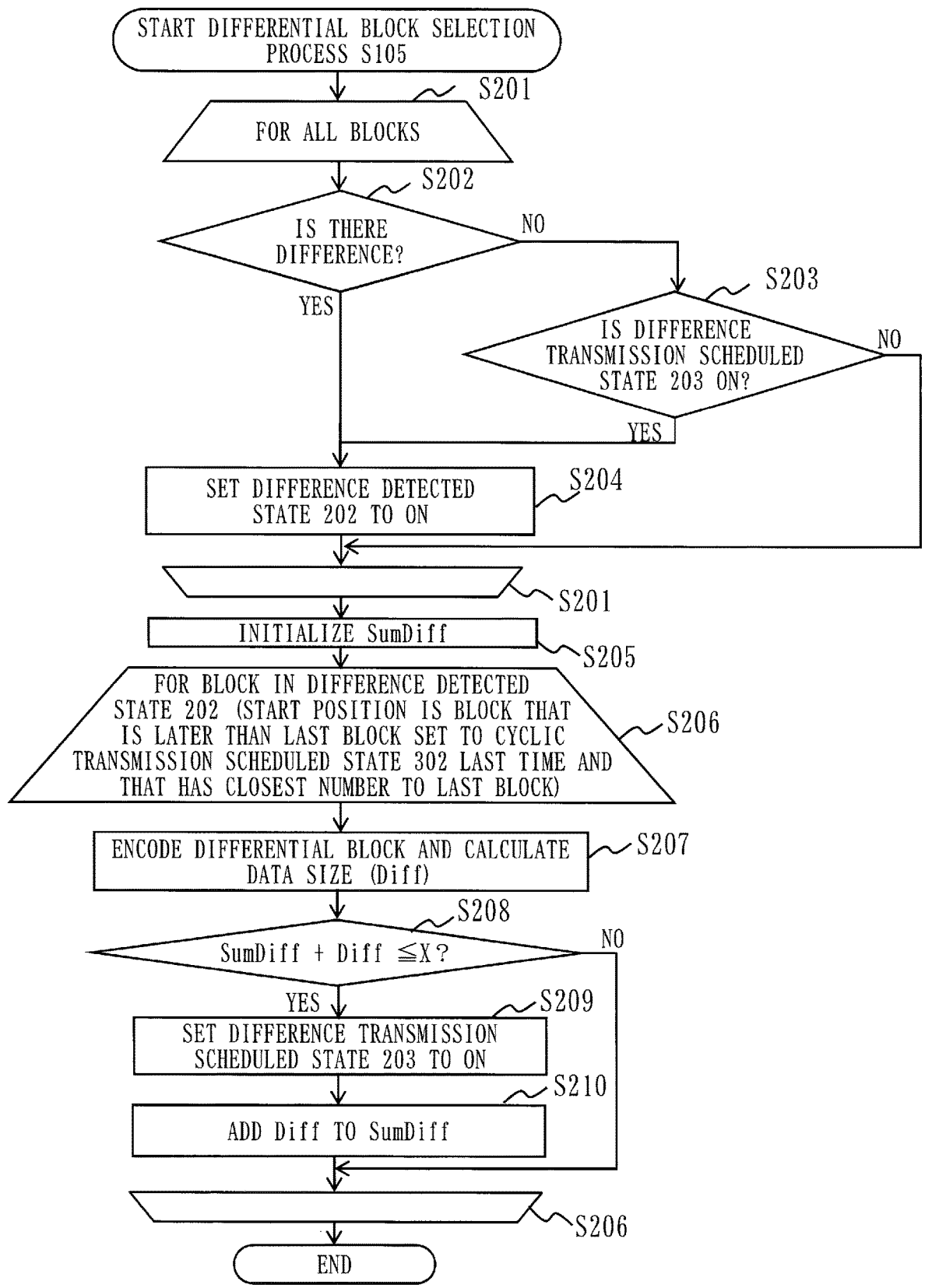
FIG. 5 is a flowchart illustrating a differential block selection process S105 according to the first embodiment.

Processes at step S202 to S204 included between loop limits S201 of FIG. 5 are performed on all divided blocks. The process starts from any block, and processing order is also any. In addition, this process is performed by the difference detecting unit 130. When the difference detecting unit 130 has completed the processes at step S202 to S204 for all blocks, the difference detecting unit 130 proceeds processing to step S205.

At step S202, the difference detecting unit 130 obtains the block image 821 and a last block image 822 from the block storage unit 182. The difference detecting unit 130 determines, for a processing-target block, whether there is a difference between the block image 821 and the last block image 822. Here, a block having a difference from the last block image 822 is referred to as differential block. The difference detecting unit 130 makes a comparison for a processing-target block of each of the block image 821 and the last block image 822, on a pixel-by-pixel basis, the pixels being included in the block. If, as a result of the comparison, even a single pixel has a difference, the difference detecting unit 130 sets the processing-target block to the difference detected state 202. If, as a result of the comparison, all pixels are the same, the difference detecting unit 130 proceeds processing to step S203.

At step S203, if all pixels are the same at step S202, the difference detecting unit 130 determines, for the processing-target block, whether the flag for the difference transmission scheduled state 203 is on. If the processing-target block is in the difference transmission scheduled state 203, processing proceeds to step S204. If the processing-target block is in a state other than the difference transmission scheduled state 203, the difference detecting unit 130 ends the process for the processing-target block and proceeds processing to the next block.

Note that it does not matter which one of the processes at step S202 and S203 is performed first by the difference detecting unit 130. In the example of FIG. 5, the difference detecting unit 130 performs step S202 first. When step S203 is performed first, the difference detecting unit 130 proceeds processing to step S202 in a case of the NO branch at step S203, and proceeds processing to step S204 in a case of the YES branch at step S203. In this case, the difference detecting unit 130 proceeds processing to step S204 if YES at step S202, and proceeds processing to the next block if NO at step S202.

At step S204, the difference detecting unit 130 sets the flag for the difference detected state 202 to on for the processing-target block, and proceeds processing to the next block.

At step S205, the differential block selecting unit 140 initializes SumDiff indicating the total value of the amounts of code, after encoding, of blocks set to the difference transmission scheduled state 203 to 0.

Then, the differential block selecting unit 140 performs processes at step S207 to S210 included between loop limits S206. The differential block selecting unit 140 performs the processes included between the loop limits S206 on blocks whose flags are the difference detected state 202. When the processes (the processes at step S207 to S210) are performed for the first time, i.e., when the captured image 811 is the first frame, the processing start position is a block present in an upper-leftmost position and having the "difference detected state 202" flag. Thereafter, when the captured image 811 is the second or subsequent frame, the processing start position is a block in the difference detected state 202 that is later than the last block set to the cyclic transmission scheduled state 302 last time and that has a block number closest to the last block.

At step S207, the differential block selecting unit 140 passes a processing-target block in the difference detected state 202 (referred to as differential block) to the encoding unit 150 to encode the differential block. The encoding unit 150 encodes the differential block using an encoding algorithm that can be used, and calculates the size Diff of the amount of code obtained after the encoding. The encoding unit 150 outputs the differential block having been encoded, as an encoded differential block, and outputs the size Diff of the encoded differential block. Namely, the encoding unit 150 passes the encoded differential block and the size Diff thereof to the differential block selecting unit 140.

At step S208, the differential block selecting unit 140 determines whether the total value of SumDiff and Diff exceeds a difference threshold X. Here, the difference threshold X is an upper limit value (also referred to as upper limit size) of the total value of encoded differential blocks that can be transmitted by single capturing. If the total value of SumDiff and Diff exceeds the difference threshold X, the differential block selecting unit 140 proceeds processing to the next differential block. If the total value of SumDiff and Diff is less than or equal to the difference threshold X, the differential block selecting unit 140 proceeds processing to step S209.

At step S209, the differential block selecting unit 140 sets the flag of the differential block to the difference transmission scheduled state 203 through the differential map recording unit 183. The encoded differential block outputted from the encoding unit 150 at step S207 serves as an encoded differential block scheduled to be transmitted, i.e., a difference encoded block 1401.

At step S210, the differential block selecting unit 140 adds the value of Diff to the current value of SumDiff.

By this, the differential block selection process S105 is completed. In the differential block selection process S105, the divided captured image (i.e., the block image 821), difference encoded blocks 1401 set to the difference transmission scheduled state 203 among the encoded differential blocks, and the value of SumDiff are finally outputted from the differential block selecting unit 140 to the cyclic block selecting unit 160. Alternatively, the block image 821 excluding the difference encoded blocks 1401, the difference encoded blocks 1401, and the value of SumDiff may be outputted.

As described above, the differential block selecting unit 140 selects one or more difference transmission scheduled blocks 2031 set to the difference transmission scheduled state 203 from differential blocks detected by the difference detecting unit 130. The differential block selecting unit 140 outputs the differential blocks to the encoding unit 150, and obtains encoded differential blocks which are the differential blocks having been encoded and the data sizes of the encoded differential blocks from the encoding unit 150. The differential block selecting unit 140 selects one or more difference transmission scheduled blocks 2031 based on the data sizes of the encoded differential blocks. In addition, when the differential block selecting unit 140 selects one or more difference transmission scheduled blocks 2031, the differential block selecting unit 140 records the state of each of the one or more difference transmission scheduled blocks 2031 as the difference transmission scheduled state 203 in the differential map 831. Note that the differential block selecting unit 140 selects, from the differential blocks, one or more difference transmission scheduled blocks 2031 in which the total value of the amounts of code used to encode the respective one or more difference transmission scheduled blocks 2031 does not exceed the difference threshold X. Then, the differential block selecting unit 140 outputs one or more difference encoded blocks 1401 obtained by encoding the one or more difference transmission scheduled blocks 2031.

Cyclic Block Selection Process S106

Figure 4:
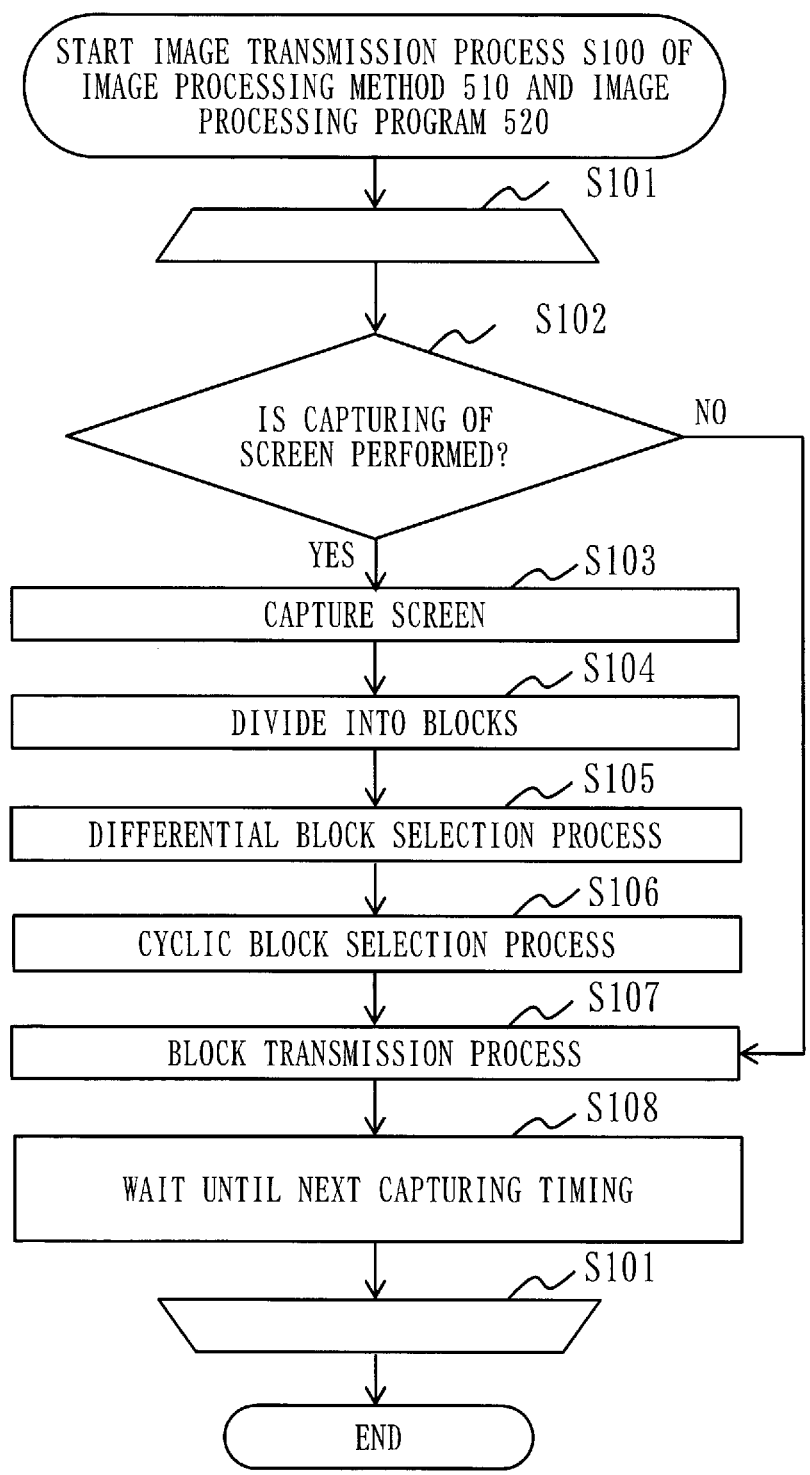
FIG. 4 is a flowchart illustrating an image transmission process S100 of an image processing method 510 and an image processing program 520 for the image processing apparatus 100 according to the first embodiment.

Next, processing proceeds to a cyclic block selection process S106 of FIG. 4. In the cyclic block selection process S106, selection and encoding of cyclic blocks to be transmitted are performed.

The cyclic block selection process S106 according to the present embodiment will be described using FIG. 6.

First, at step S301, the cyclic block selecting unit 160 initializes SumRnd to 0. SumRnd indicates the total value of the amounts of code, after encoding, of blocks set to the cyclic transmission scheduled state 302.

Figure 6:
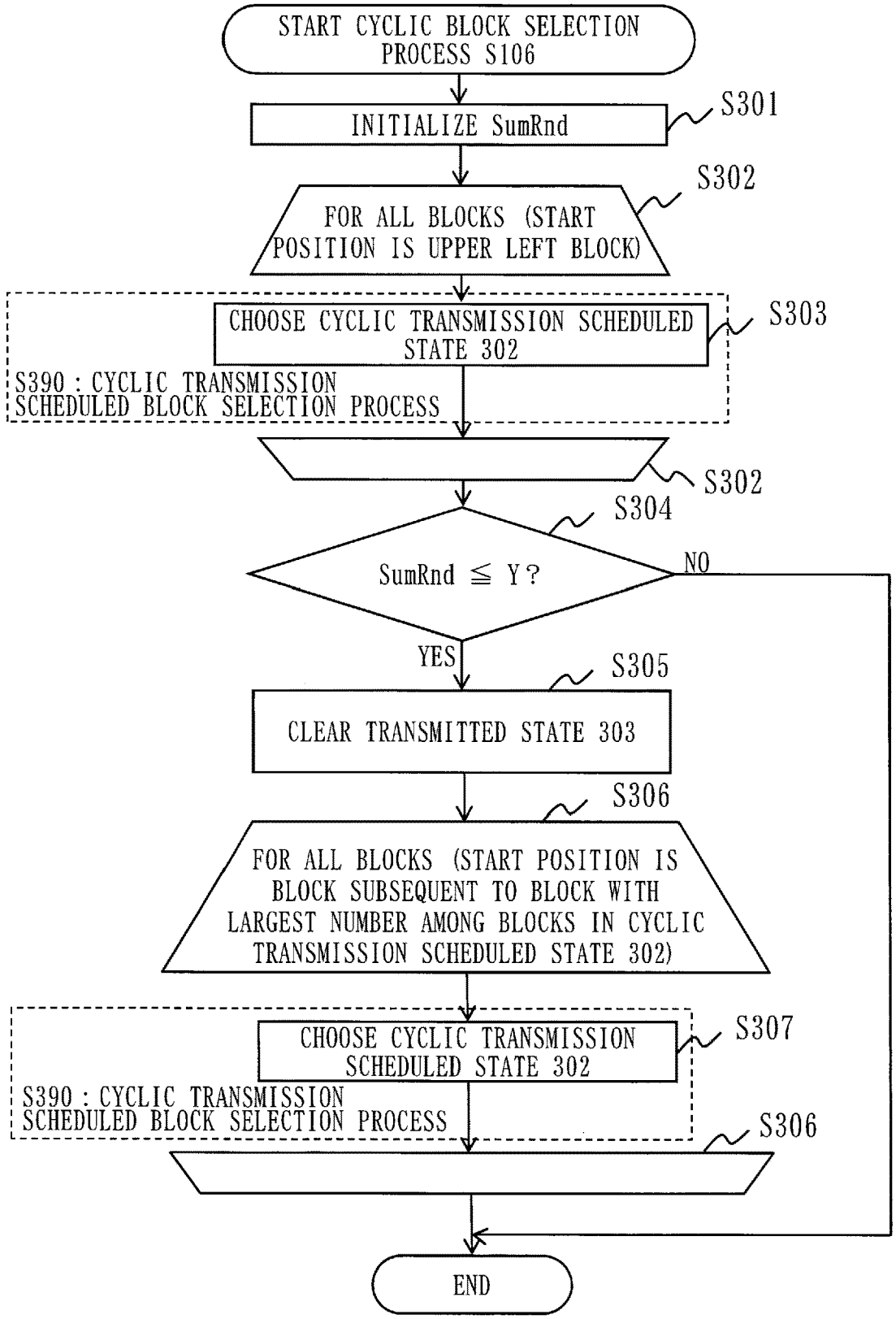
FIG. 6 is a flowchart illustrating a cyclic block selection process S106 according to the first embodiment.

A cyclic transmission scheduled block selection process S390 at step S303 which is included between loop limits S302 of FIG. 6 is performed on all blocks.

The cyclic block selecting unit 160 receives the divided captured image (i.e., the block image 821), some of the encoded blocks in which differences are detected (i.e., the difference encoded blocks 1401), and the value of SumDiff from the differential block selecting unit 140. At step S303 included between the loop limits S302, the cyclic block selecting unit 160 starts the process on the received block image 821 from a block located in an upper-leftmost position. Processing order matches the block numbers.

At step S303, the cyclic block selecting unit 160 performs a cyclic transmission scheduled block selection process S390.

The cyclic transmission scheduled block selection process S390 according to the present embodiment will be described in detail using FIG. 7.

Cyclic Transmission Scheduled Block Selection Process S390

At step S401, the cyclic block selecting unit 160 determines the state of a processing-target block by referring to the differential map 831 and the cyclic map 841. The cyclic block selecting unit 160 obtains the state of the processing-target block through the differential map recording unit 183 and the cyclic map recording unit 184. If the state of the processing-target block is the difference transmission scheduled state 203, the cyclic transmission scheduled state 302, or the transmitted state 303, the cyclic block selecting unit 160 proceeds processing to the next block without performing processes at and after step S402. If all are NO, i.e., if the state of the processing-target block is none of the difference transmission scheduled state 203, the cyclic transmission scheduled state 302, and the transmitted state 303, the cyclic block selecting unit 160 performs the processes at and after step S402.

Here, blocks other than the one or more difference transmission scheduled blocks 2031 (i.e., blocks whose flags for the difference transmission scheduled state 203 are on) among the plurality of blocks are cyclic blocks. The cyclic blocks include blocks that are not in any of the difference transmission scheduled state 203, the cyclic transmission scheduled state 302, and the transmitted state 303.

At step S402, the cyclic block selecting unit 160 passes the processing-target block, i.e., a cyclic block, to the encoding unit 150. The encoding unit 150 encodes the cyclic block using an encoding algorithm that can be used, and calculates a size (referred to as Rnd) obtained after the encoding. The encoding unit 150 outputs the cyclic block having been encoded, as an encoded cyclic block, and outputs the size Rnd of the encoded cyclic block. Namely, the encoding unit 150 passes the encoded cyclic block and the size Rnd thereof to the cyclic block selecting unit 160.

The cyclic block selecting unit 160 receives the encoded cyclic block and the size Rnd of the encoded cyclic block, and performs two conditional branch processes (step S403 and S404).

At step S403, the cyclic block selecting unit 160 finds the total value of SumDiff, SumRnd, and Rnd, and determines whether the total value is less than or equal to the total value of the difference threshold X and a lower limit value Y. Here, the lower limit value Y is a lower limit size of encoded cyclic blocks that can be transmitted by single capturing. If the total value of SumDiff, SumRnd, and Rnd is less than or equal to the total value of the difference threshold X and the lower limit value Y, processing proceeds to step S404. Otherwise, the cyclic transmission scheduled block selection process S390 ends without performing processes at and after step S404.

At step S404, the cyclic block selecting unit 160 determines whether a total of SumRnd and Rnd is less than or equal to the upper limit value Z. Here, the upper limit value Z is an upper limit size of encoded cyclic blocks that can be transmitted by single capturing. If the total value of SumRnd and Rnd is less than or equal to the upper limit value Z, processing proceeds to step S405. Otherwise, the cyclic transmission scheduled block selection process S390 ends without performing processes at and after step S405.

At step S405, the cyclic block selecting unit 160 sets the flag for the cyclic transmission scheduled state 302 of the processing-target cyclic block to on through the cyclic map recording unit 184. Here, the processing-target cyclic block set to the cyclic transmission scheduled state 302 is a cyclic transmission scheduled block 3021. In addition, a block obtained by encoding the cyclic transmission scheduled block 3021 is a cyclic encoded block 1601.

At step S406, the cyclic block selecting unit 160 adds the value of Rnd to SumRnd.

By this, the cyclic transmission scheduled block selection process S390 is completed. In the process at step S303, finally, blocks set to the cyclic transmission scheduled state 302 are selected, and the states of the blocks are set to the cyclic transmission scheduled state 302.

Next, referring back to FIG. 6, description continues.

At step S304, the cyclic block selecting unit 160 compares SumRnd with the lower limit value Y. If, as a result of the comparison, SumRnd is less than or equal to the lower limit value Y, the cyclic block selecting unit 160 proceeds processing to step S305. If SumRnd exceeds the lower limit value Y, the cyclic block selection process S106 ends.

Processes at and after step S305 are performed when all blocks of the cyclic map 841 are in the cyclic transmission scheduled state 302 or the transmitted state 303 and when the total value of blocks having been set to the difference transmission scheduled state 203 or the cyclic transmission scheduled state 302 in the processes performed so far is less than or equal to the total value of the difference threshold X and the lower limit value Y, which is transmission allowable size.

First, at step S305, the cyclic block selecting unit 160 sets the transmitted state 303 to the untransmitted state 301 for all blocks in which the transmitted state 303 is on in the cyclic map 841, through the cyclic map recording unit 184.

Thereafter, the cyclic block selecting unit 160 performs a process at step S307 included between loop limits S306. The process at step S307 is the cyclic transmission scheduled block selection process S390 described in FIG. 7. A block start position at the loop limits S306 is a block subsequent to a block with the largest number among the blocks in the cyclic transmission scheduled state 302.

At step S307, the cyclic block selecting unit 160 starts the cyclic transmission scheduled block selection process S390 from a block subsequent to a block with the largest number among the blocks in the cyclic transmission scheduled state 302. The cyclic transmission scheduled block selection process S390 is the same as that described in FIG. 7.

The description of the cyclic block selection process S106 of FIG. 6 ends here. In the cyclic block selection process S106, finally, the total value of the amounts of code of blocks set to the cyclic transmission scheduled state 302 is less than or equal to the preset upper limit value Z and greater than or equal to the preset lower limit value Y, and the states of those blocks are set to the cyclic transmission scheduled state 302.

As described above, the cyclic block selecting unit 160 selects one or more cyclic transmission scheduled blocks 3021 to be encoded and transmitted, from cyclic blocks which are blocks other than the one or more difference transmission scheduled blocks 2031 among the plurality of blocks. The cyclic block selecting unit 160 outputs the cyclic blocks to the encoding unit 150, and obtains encoded cyclic blocks which are the cyclic blocks having been encoded and the data sizes of the encoded cyclic blocks from the encoding unit 150. The cyclic block selecting unit 160 selects one or more cyclic transmission scheduled blocks 3021 based on the data sizes of the encoded cyclic blocks. In addition, when the cyclic block selecting unit 160 selects one or more cyclic transmission scheduled blocks 3021, the cyclic block selecting unit 160 records the state of each of the one or more cyclic transmission scheduled blocks 3021 as the cyclic transmission scheduled state 302 in the cyclic map 841. Note that the total value of the amounts of code used to encode the respective one or more cyclic transmission scheduled blocks 3021 is in a range of the lower limit value Y and the upper limit value Z.

Block Transmission Process S107

Next, referring back to FIG. 4, description continues.

After the process of the cyclic block selection process S106, processing proceeds to a block transmission process S107. In the block transmission process S107, the block transmitting unit 170 performs a transmission process for transmitting the one or more difference encoded blocks 1401 and the one or more cyclic encoded blocks 1601 that have been encoded by the encoding unit 150. It is assumed that in the block transmitting unit 170 the amount of code that can be transmitted at a time in a transmission process is one or more difference encoded blocks and one or more cyclic encoded blocks up to an amount-of-code threshold. Namely, a value obtained by adding together the above-described difference threshold X and upper limit value Z needs to be less than or equal to the amount-of-code threshold.

The block transmission process S107 according to the present embodiment will be described using FIG. 8.

The block transmission process S107 is a process of transmitting blocks set to the difference transmission scheduled state 203 or the cyclic transmission scheduled state 302. In the block transmission process S107, processes at step S502 to S506 which are included between loop limits S501 are performed. The block transmission process S107 is a loop process for each block, with the start position being an upper left block.

First, at step S502, the block transmitting unit 170 determines whether a processing-target block is in the difference transmission scheduled state 203. If the processing-target block is in the difference transmission scheduled state 203, processing proceeds to step S504. Otherwise, processing proceeds to step S503.

At step S503, the block transmitting unit 170 determines whether the processing-target block is in the cyclic transmission scheduled state 302. If the processing-target block is in the cyclic transmission scheduled state 302, processing proceeds to step S504. Otherwise, a process for the next block is performed without performing processes at and after step S503.

At step S504, the block transmitting unit 170 packetizes the processing-target block and performs a transmission process. Examples of protocols used for the packetization and transmission process include transmission control protocol (TCP), user datagram protocol (UDP), etc.

At step S505, the block transmitting unit 170 sets a state of the differential map 831 corresponding to the processing-target block to the normal state 201 through the differential map recording unit 183.

Furthermore, at step S506, the block transmitting unit 170 sets a state of the cyclic map 841 corresponding to the processing-target block to the transmitted state 303 through the cyclic map recording unit 184.

Namely, the block transmitting unit 170 records the state of each of the one or more difference encoded blocks 1401 and the one or more cyclic encoded blocks 1601 as the transmitted state 303 in the block state information 851.

After the block transmission process S107, at step S108, the image processing apparatus 100 waits until the next capturing timing comes. A method for determining whether capturing timing has come includes, for example, a method in which it is determined whether the image processing apparatus 100 has waited until the elapsed time from when the capturing is performed (step S103 is performed) passes a certain period of time, etc.

The description of the image transmission process S100 according to the present embodiment ends here.

Other Configurations

Although in the present embodiment the functions of the "units" of the image processing apparatus 100 are implemented by software, as a variant, the functions of the "units" of the image processing apparatus 100 may be implemented by hardware.

A configuration of the image processing apparatus 100 according to a variant of the present embodiment will be described using FIG. 9.

Figure 9:
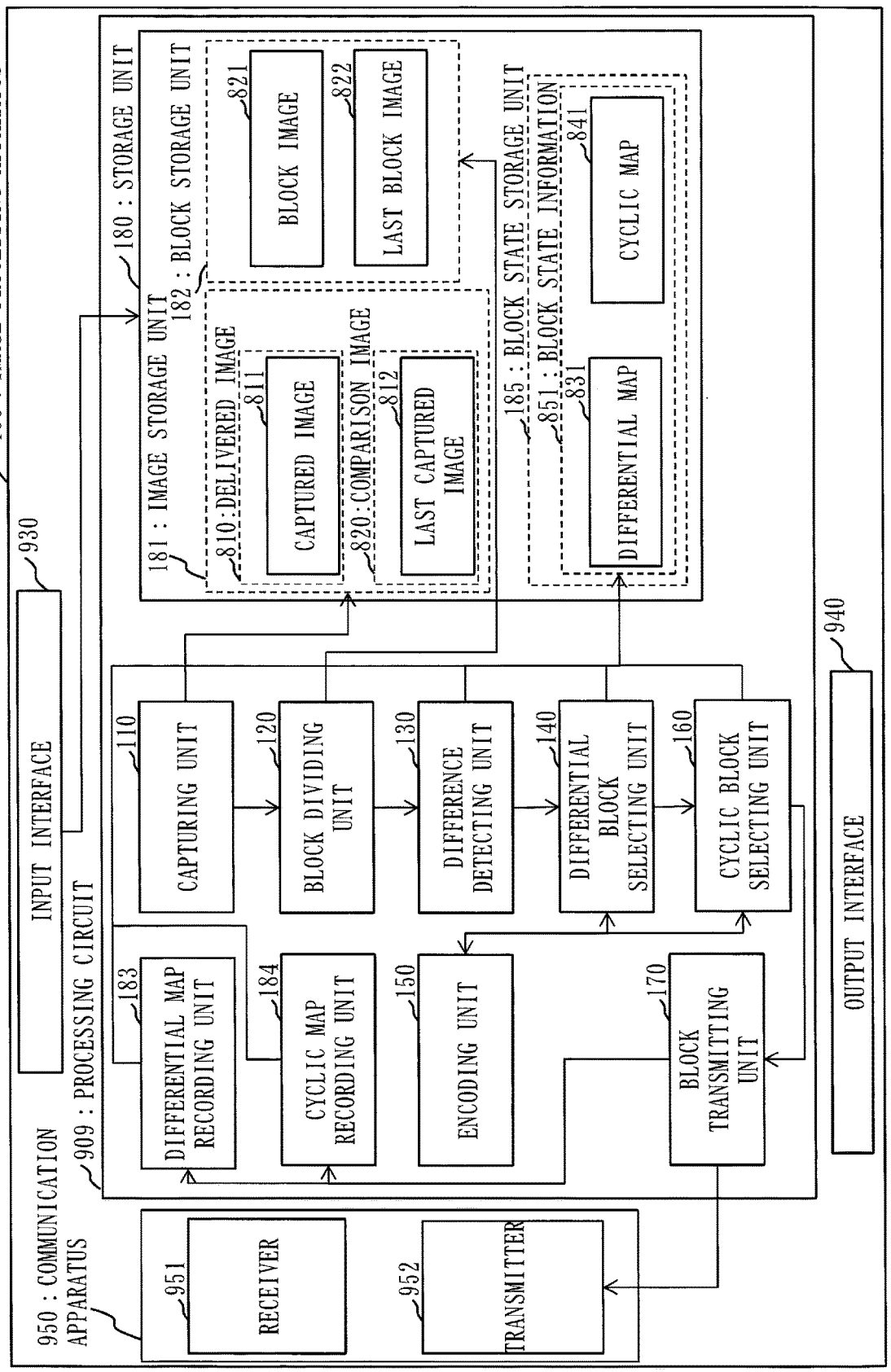
FIG. 9 is a configuration diagram of an image processing apparatus 100 according to a variant of the first embodiment.

As illustrated in FIG. 9, the image processing apparatus 100 includes hardware such as a processing circuit 909, an input interface 930, an output interface 940, and a communication apparatus 950.

The processing circuit 909 is a dedicated electronic circuit that implements the above-described functions of the "units" and storage unit 180. The processing circuit 909 is specifically a single circuit, a combined circuit, a programmed processor, a parallel programmed processor, a logic IC, a gate array (GA), an application specific integrated circuit (ASIC), or a field-programmable gate array (FPGA).

The image processing apparatus 100 may include a plurality of processing circuits which are a substitution of the processing circuit 909. By the plurality of processing circuits as a whole, the functions of the "units" are implemented. Each processing circuit is, as with the processing circuit 909, a dedicated electronic circuit.

As another variant, the functions of the image processing apparatus 100 may be implemented by a combination of software and hardware. Namely, some of the functions of the image processing apparatus may be implemented by dedicated hardware and other functions may be implemented by software.

The processor 910, the storage apparatus 920, and the processing circuit 909 are collectively referred to as "processing circuitry". That is, regardless of whether the configuration of the image processing apparatus is the one illustrated in FIG. 1 or 9, the functions of the "units" and the storage unit 180 are implemented by the processing circuitry.

The "units" may be read as "steps", "procedures", or "processes". In addition, the functions of the "units" may be implemented by firmware.

Description of the Advantageous Effects of the Present Embodiment

As described above, in the image processing apparatus 100 according to the present embodiment, the amount of code per delivered screen (picture) is provided with the amount-of-code threshold which is an upper limit. When the overall amount of code is expected to exceed the amount-of-code threshold, some blocks of one delivered screen having been encoded in a range in which the amount-of-code threshold is not exceeded are transmitted. Blocks that have not been able to be transmitted are carried over to the next image transmission process for one delivered screen (one picture). The image processing apparatus 100 according to the present embodiment chooses blocks to be encoded at this time while allowing the blocks to be cycled, and thus, can reliably transmit blocks for the entire screen.

In addition, in the image processing apparatus 100 according to the present embodiment, data to be transmitted is separated into differential blocks and cyclic blocks, and the total amount of data of the differential blocks and the cyclic blocks is suppressed to less than or equal to a certain value for each transmission, by which transfer rate can be stabilized. In addition, for the differential blocks, too, since the whole data is transmitted, transmission of the differential blocks and transmission of the cyclic blocks are handled in the same manner. Furthermore, when the amount of data of differential blocks becomes large, the differential blocks are transmitted so as to be cycled for each frame. By this, even when the amount of data of differential blocks is large, the entire screen can be reliably updated.

Second Embodiment

Description of Configurations

In the present embodiment, a difference from the first embodiment will be mainly described.

In the present embodiment, the same configurations as those described in the first embodiment are denoted by the same reference signs and description thereof is omitted.

In the first embodiment, step S102 of the image transmission process S100 of FIG. 4 is a process in which, when there is no block in a transmission scheduled state, i.e., the difference transmission scheduled state 203 or the cyclic transmission scheduled state 302, capturing of a screen is performed. That is, in the first embodiment, when there is a block in a transmission scheduled state, the block transmission process S107 is given priority and capturing is not performed.

In the present embodiment, an image transmission process S100a will be described in which, even if there is a block in a transmission scheduled state, a screen is always captured.

Description of Operation

Figure 10:
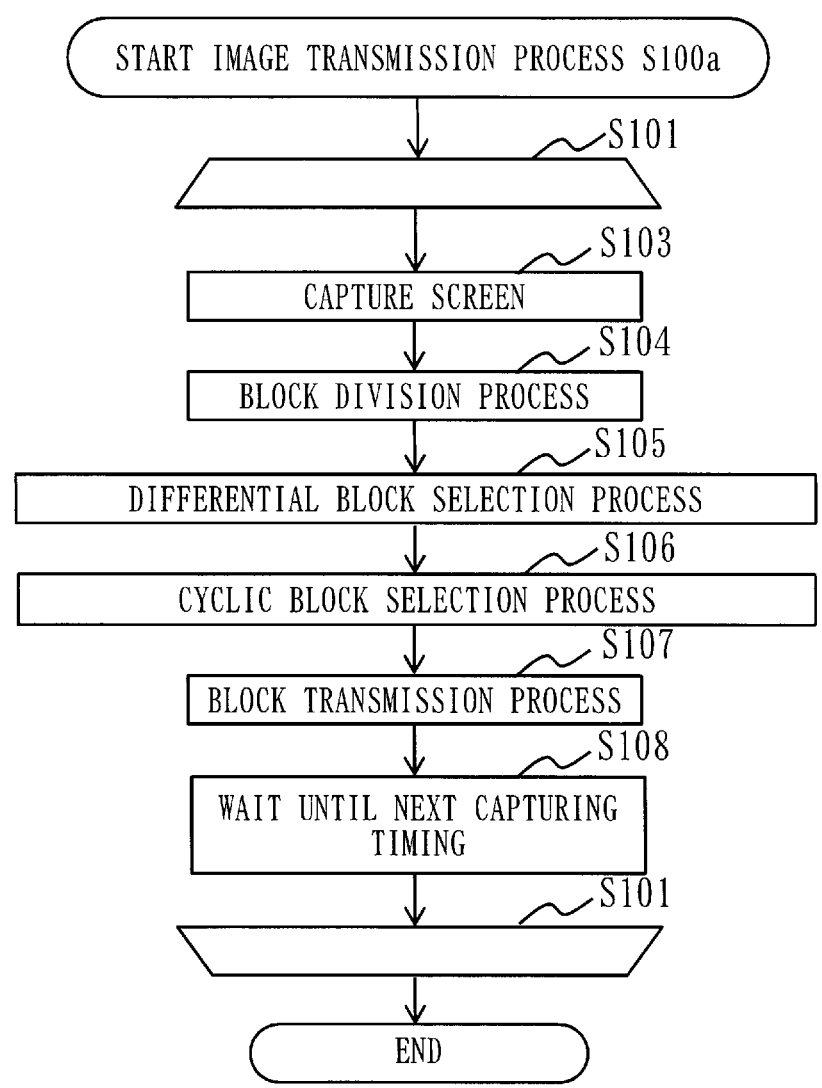
FIG. 10 is a flowchart illustrating an image transmission process S100a according to a second embodiment.

FIG. 10 is a diagram illustrating the image transmission process S100a according to the present embodiment.

The image transmission process S100a illustrated in FIG. 10 does not have step S102 illustrated in FIG. 4. Other than that, processing operations are the same as those of the image transmission process S100 for the image processing apparatus 100 illustrated in FIG. 4.

Description of Advantageous Effects According to the Present Embodiment

As described above, according to the image transmission process S100a according to the present embodiment, since a screen is captured every frame, it becomes possible to update some areas of a screen every frame when an image has a lot of changes.

Third Embodiment

Description of Configurations

In the present embodiment, differences from the first embodiment will be mainly described.

In the present embodiment, the same configurations as those described in the first embodiment are denoted by the same reference signs and description thereof is omitted.

Figure 8:
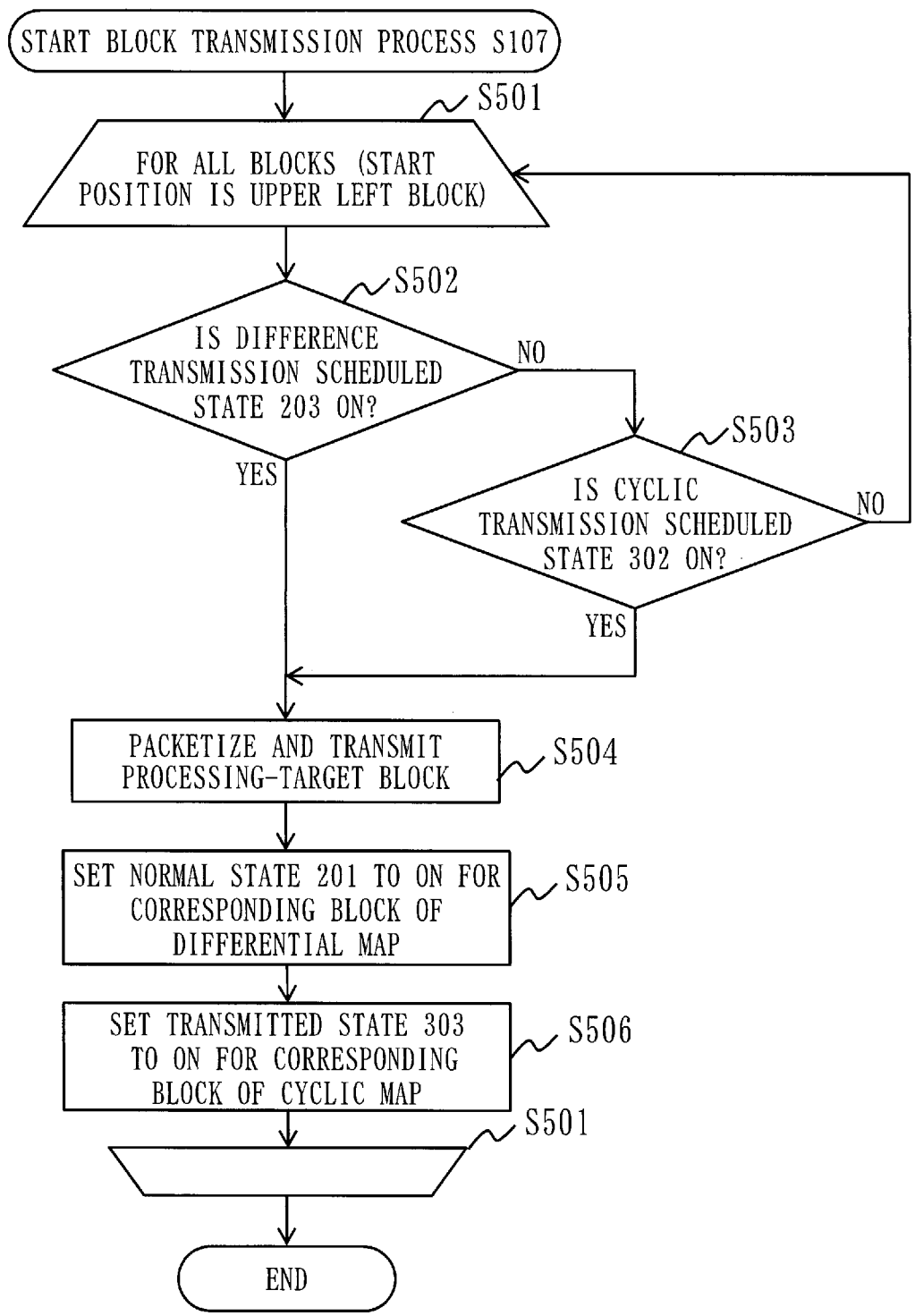
FIG. 8 is a flowchart illustrating a block transmission process S107 according to the first embodiment.

In the first embodiment, in the block transmission process S107 of FIG. 8, all blocks in the difference transmission scheduled state 203 or the cyclic transmission scheduled state 302 are transmitted.

In the present embodiment, an image transmission process S100b will be described that has a block transmission process S107b in which whether to continue transmission can be determined by user input indicating discontinuation of transmission, network load, execution load for other applications (CPU load), etc. In the block transmission process S107b of the present embodiment, it is determined whether to continue the transmission process by user input indicating discontinuation of transmission or by determining whether network load, execution load for other applications (CPU load), etc., exceeds a predetermined value.

In addition, in the present embodiment, in the conditional branch that determines whether to perform capturing of a screen at S102 of FIG. 4, the determination is made by determining whether the total amount of data of blocks in the difference transmission scheduled state 203 or the cyclic transmission scheduled state 302 exceeds X+Y. If the total amount of data exceeds X+Y, an instruction to transmit the blocks in the difference transmission scheduled state 203 or the cyclic transmission scheduled state 302 is outputted to the block transmitting unit 170 without performing capturing. If the total amount of data is less than or equal to X+Y, capturing is performed and processing proceeds to S104. As described above, the difference threshold X is the upper limit size of the total value of encoded differential blocks that can be transmitted by single capturing. In addition, the lower limit value Y is the lower limit size of encoded cyclic blocks that can be transmitted by single capturing.

Description of Operation

In the process at S102 of FIG. 4, specifically, in order for the capturing unit 110 to determine whether to perform capturing of a screen, the capturing unit 110 inquires the differential map recording unit 183 and the cyclic map recording unit 184 about whether there is a block in a transmission scheduled state, i.e., a block whose flag for the difference transmission scheduled state 203 is on or whose flag for the cyclic transmission scheduled state 302 is on. If there is no block in a transmission scheduled state or no block in the difference transmission scheduled state 203, or if, though there are blocks in a transmission scheduled state, a total of the amounts of data of the blocks is less than or equal to X+Y, the capturing unit 110 proceeds processing to step S103, and performs capturing of a screen and stores a captured image 811 in the image storage unit 181. If there are blocks in a transmission scheduled state and a total of the amounts of data of the blocks exceeds X+Y, the capturing unit 110 proceeds processing to the block transmission process S107b.

Figure 11:
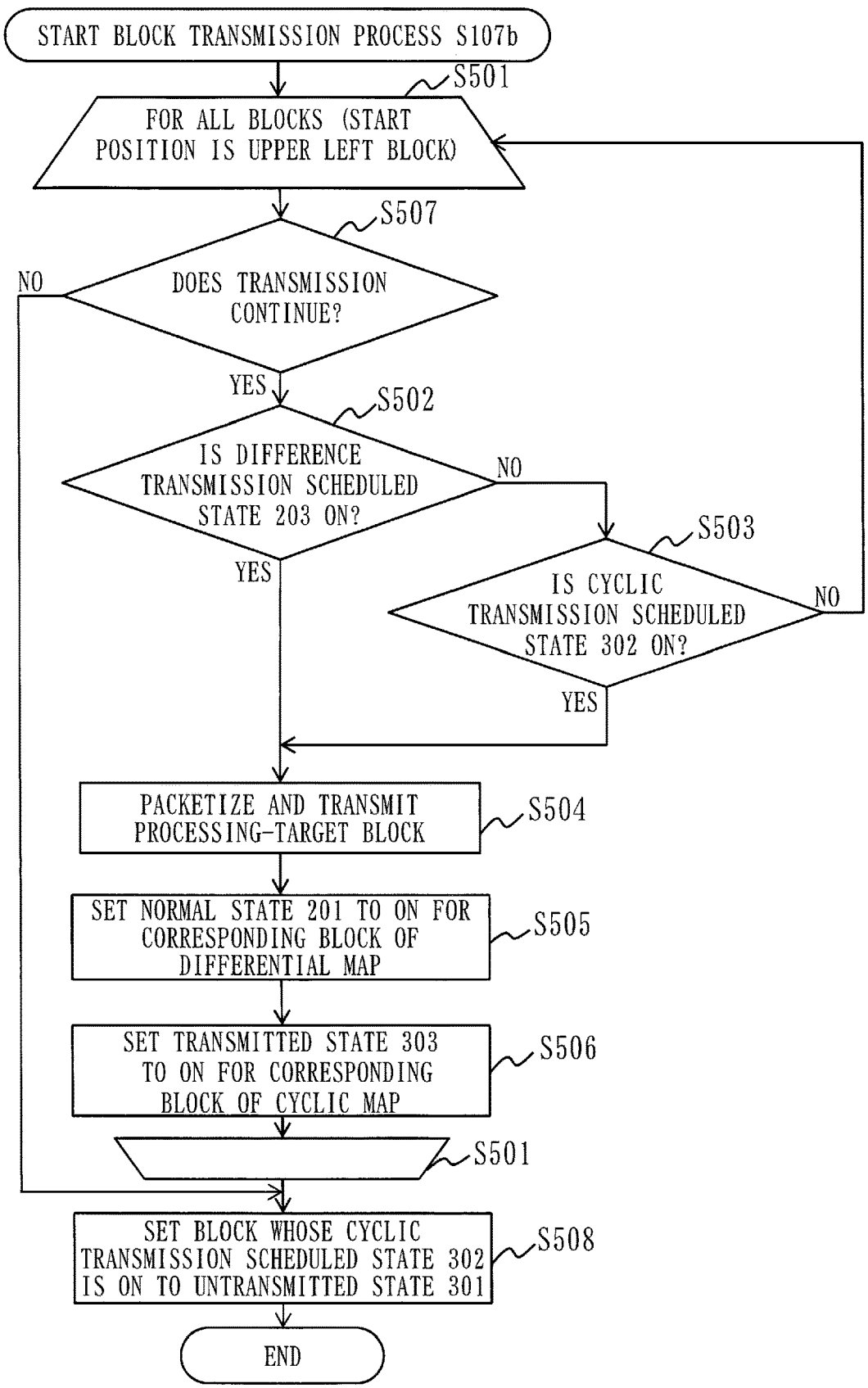
FIG. 11 is a flowchart illustrating a block transmission process S107b according to a third embodiment.

FIG. 11 is a diagram illustrating the block transmission process S107b according to the present embodiment.

The block transmission process S107b illustrated in FIG. 11 is such that step S507 and S508 are added to the block transmission process S107 illustrated in FIG. 8. Other than that, processing operations are the same as those of the block transmission process S107 illustrated in FIG. 8.

At step S507, the block transmitting unit 170 determines during the performing of the transmission process whether to continue the transmission process. If the block transmitting unit 170 determines not to continue the transmission process, the block transmitting unit 170 discontinues the transmission process. Specifically, the block transmitting unit 170 determines whether to continue transmission by user input indicating discontinuation of transmission or by determining whether network load, execution load for other applications (CPU load), etc., exceeds a predetermined value. If it is determined to continue transmission, processing proceeds to step S502, and if it is determined not to continue transmission, processing transitions to step S508.

At step S508, if there is a block whose cyclic transmission scheduled state 302 is on, the state of the corresponding block is changed to the untransmitted state 301. Thereafter, the block transmission process S107b ends.

Description of Advantageous Effects According to the Present Embodiment

As described above, according to the image transmission process S100b according to the present embodiment, by allowing to discontinue a transmission process, it becomes possible to adjust load for the transmission process at step S504 itself or network load.

Fourth Embodiment

Description of Configurations

In the present embodiment, differences from the first embodiment will be mainly described.

In the present embodiment, the same configurations as those described in the first embodiment are denoted by the same reference signs and description thereof is omitted.

In the first embodiment, encoding of data is performed by passing blocks from the differential block selecting unit 140 and the cyclic block selecting unit 160 to the encoding unit 150.

In the present embodiment, a scheme in which encoding of data is performed only from the block dividing unit 120 will be described.

A configuration of an image processing apparatus 100c according to the present embodiment will be described using FIG. 12.

Figure 12:
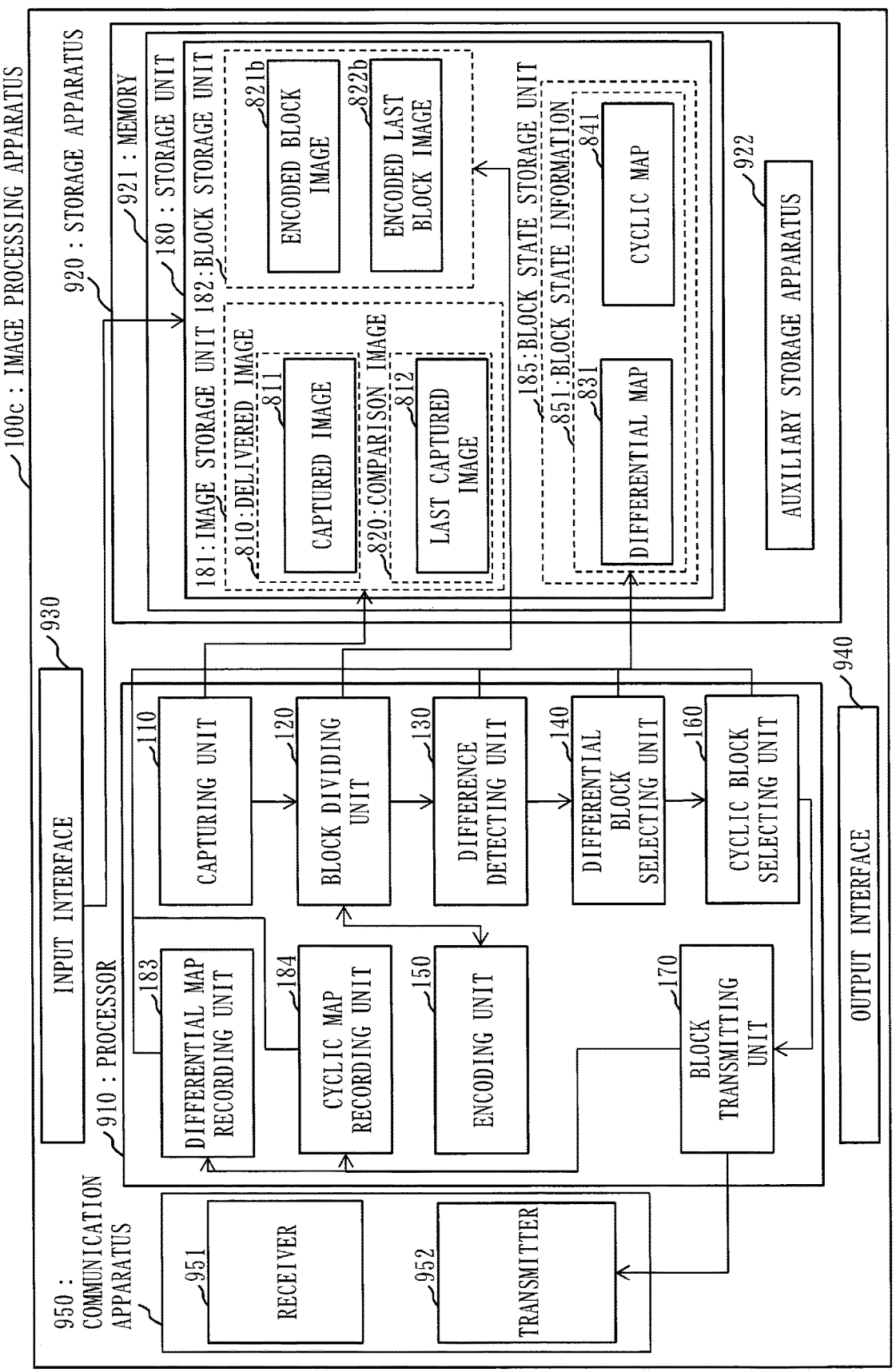
FIG. 12 is a configuration diagram of an image processing apparatus 100c according to a fourth embodiment.

A difference in the image processing apparatus 100c of FIG. 12 from the image processing apparatus 100 of FIG. 1 is that data stored in the block storage unit 182 is an encoded block image 821b and an encoded last block image 822b. The block dividing unit 120 outputs an unencoded block to the encoding unit 150. The encoding unit 150 receives an unencoded block only from the block dividing unit 120, performs an encoding process, and outputs encoded data and a data size of the encoded data to the block dividing unit 120. An encoding method is the same as that of the first embodiment. The encoded block image 821b is encoded data and a data size of the encoded data.

The block dividing unit 120 stores the encoded data and data size of the encoded data outputted from the encoding unit 150 in the block storage unit 182. The block storage unit 182 may store pieces of encoded data and data sizes of the pieces of encoded data across frames. Namely, the block storage unit 182 accumulates pieces of encoded data and data sizes of the pieces of encoded data which are outputted from the block dividing unit 120.

Description of Operation

Figure 13:
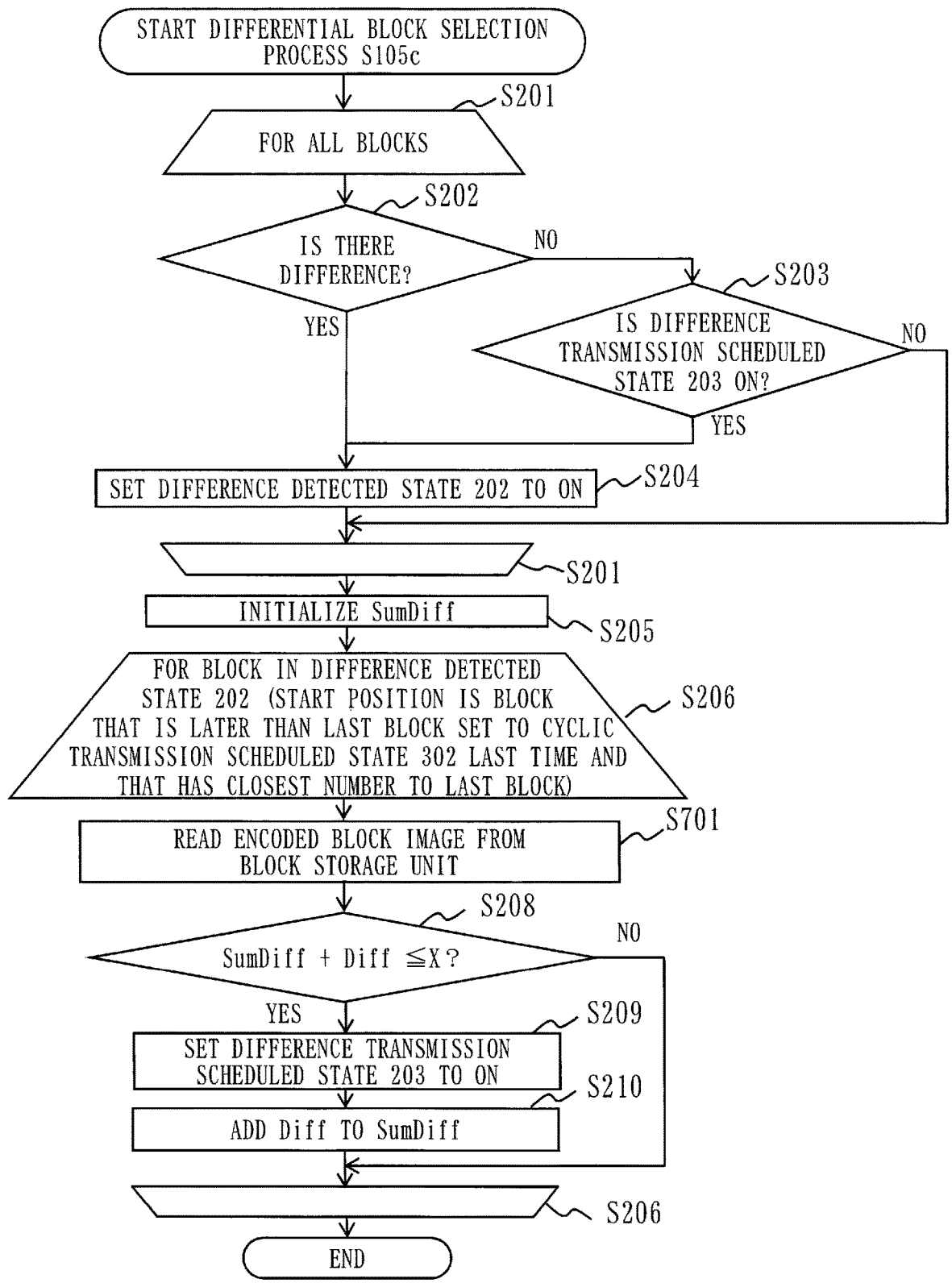
FIG. 13 is a flowchart illustrating a differential block selection process S105c according to the fourth embodiment.
Figure 14:
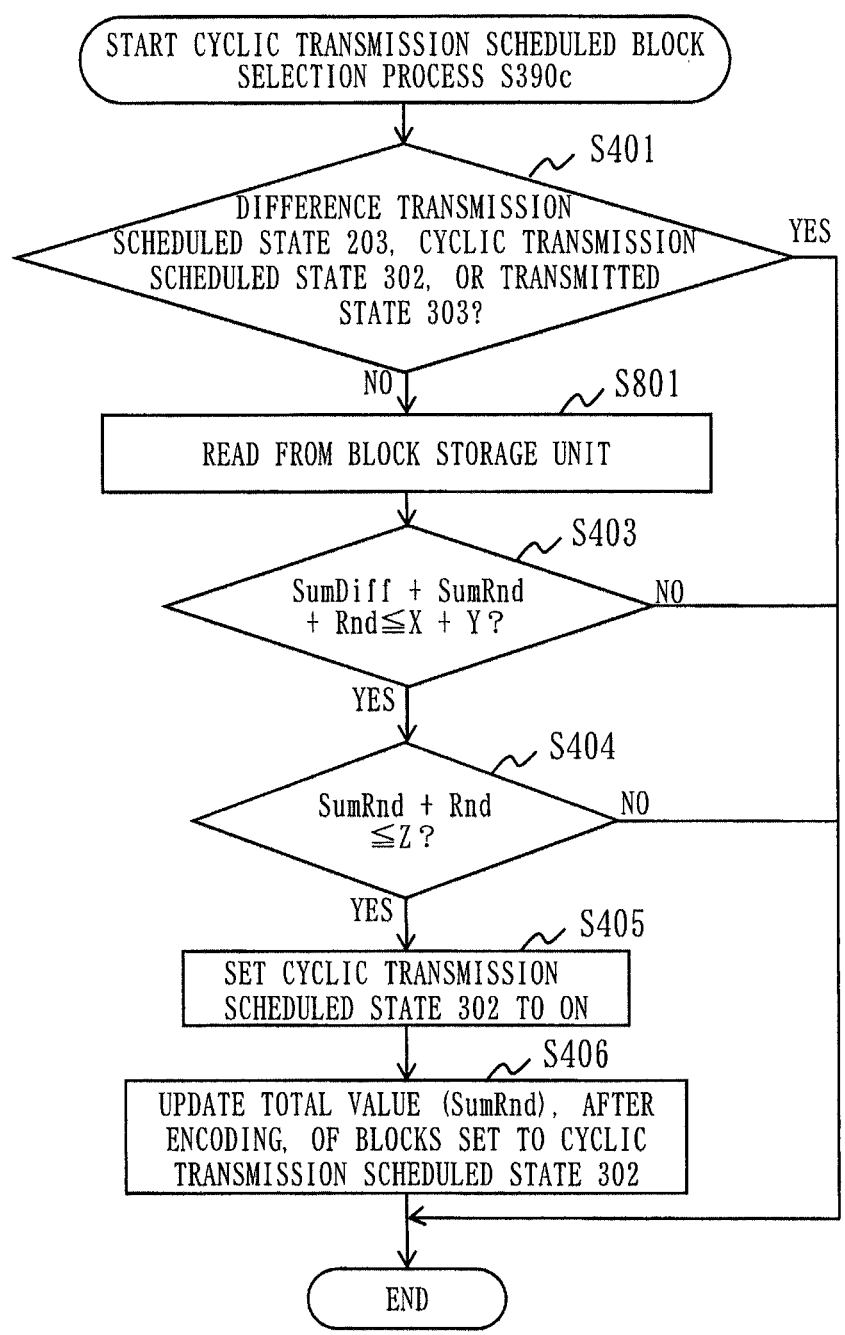
FIG. 14 is a flowchart illustrating a cyclic transmission scheduled block selection process S390c according to the fourth embodiment.
Figure 17:
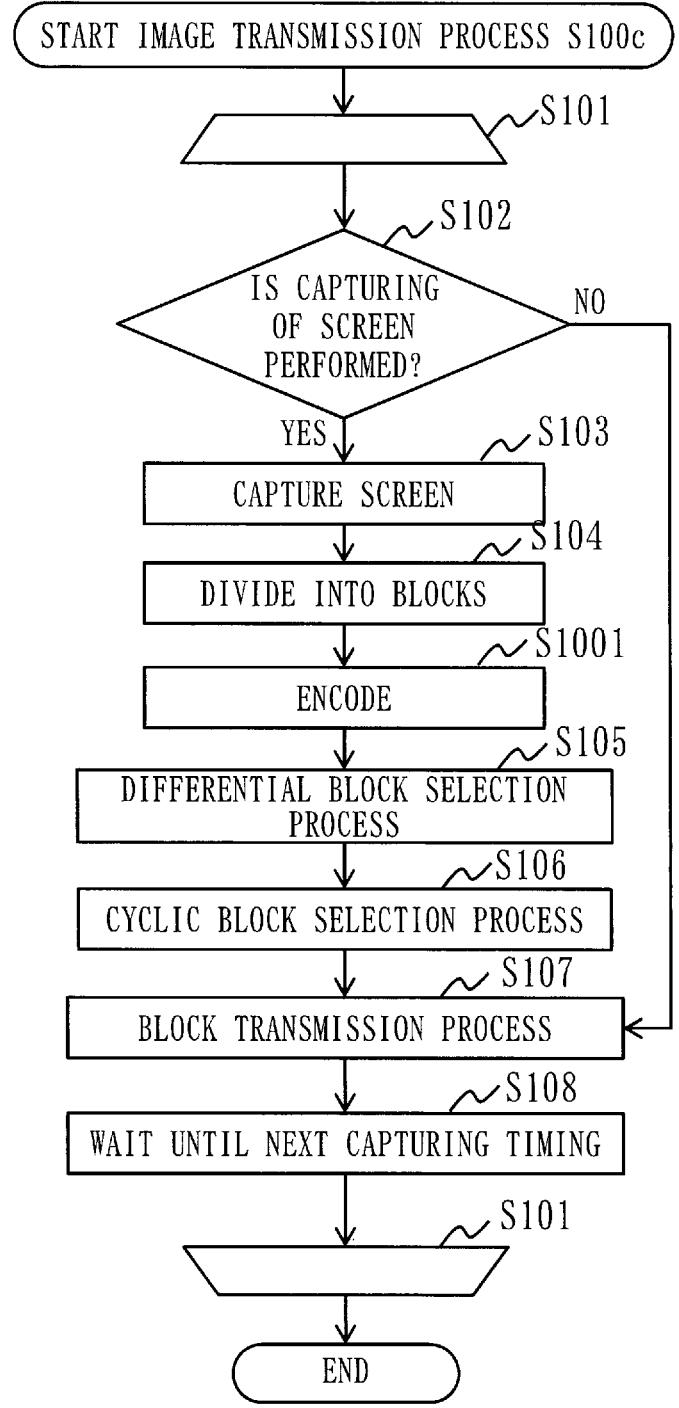
FIG. 17 is a flowchart illustrating an image transmission process S100c of an image processing method 510 and an image processing program 520 for the image processing apparatus 100c according to the fourth embodiment.

FIG. 17 is a diagram illustrating an image transmission process S100c of an image processing method 510 and an image processing program 520 for the image processing apparatus 100c according to the present embodiment. FIG. 13 is a diagram illustrating a differential block selection process S105c according to the present embodiment. In addition, FIG. 14 is a diagram illustrating a cyclic transmission scheduled block selection process S390c according to the present embodiment.

In FIG. 17, step S1001 is added to FIG. 4 of the first embodiment. FIG. 13 is the same as FIG. 5 except that step S701 is added to and step S207 is deleted from FIG. 5 of the first embodiment. In addition, FIG. 14 is the same as FIG. 7 except that step S801 is added to and step S402 is deleted from FIG. 7 of the first embodiment.

In the image processing method 510 of FIG. 17, encoding performed at step S207 of the differential block selection process S105 of FIG. 5 is performed at step S1001 by the block dividing unit 120. At step S1001, the block dividing unit 120 records encoded data and a data size of the encoded data in the block storage unit 182.

Although at step S207 of FIG. 5 an encoding process is performed, at step S701 of FIG. 13 the differential block selecting unit 140 reads encoded data and a data size of the encoded data from the block storage unit 182. Namely, at step S701, the differential block selecting unit 140 obtains an encoded differential block obtained by encoding a differential block and a data size of the encoded differential block from the block storage unit 182, and selects one or more difference transmission scheduled blocks 2031 based on the data sizes of the encoded differential blocks.

Figure 7:
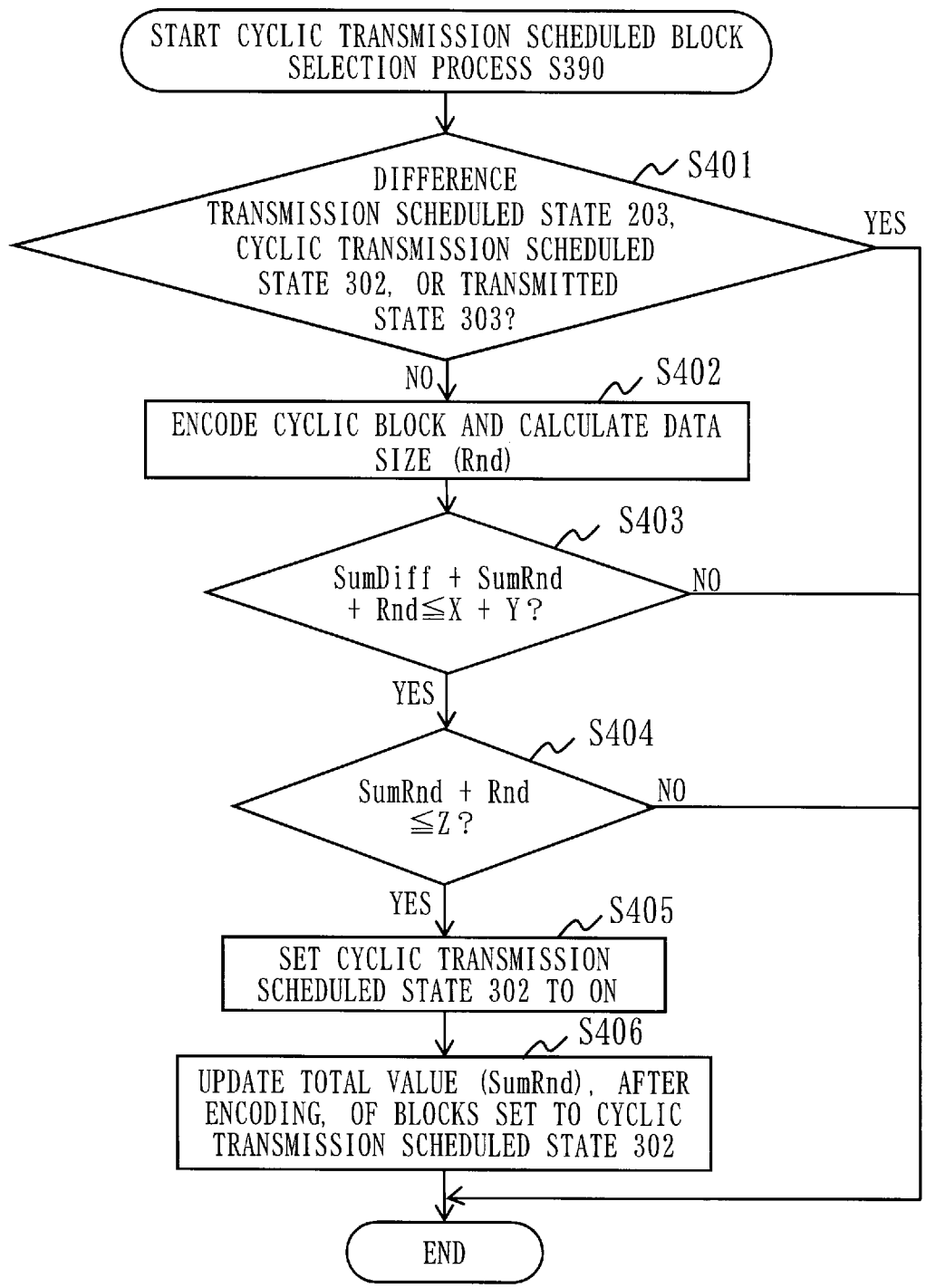
FIG. 7 is a flowchart illustrating a cyclic transmission scheduled block selection process S390 according to the first embodiment.

In addition, in the cyclic transmission scheduled block selection process S390c of FIG. 14, step S801 is performed instead of encoding of data performed at step S402 of FIG. 7.

At step S801, the cyclic block selecting unit 160 reads encoded data and a data size of the encoded data from the block storage unit 182.

Description of Advantageous Effects of the Present Embodiment

As described above, according to the image processing apparatus 100c according to the present embodiment, since the differential block selecting unit 140 and the cyclic block selecting unit 160 compare encoded data, the amount of data to be compared decreases over a case of comparing data obtained before encoding, enabling to reduce load for a comparison process.

Fifth Embodiment

Description of Configurations

In the present embodiment, differences from the second embodiment will be mainly described.

In the present embodiment, the same configurations as those described in the first to fourth embodiments are denoted by the same reference signs and description thereof is omitted.

In the present embodiment, a configuration will be described in which the order in which a difference detecting unit 130d and a block dividing unit 120d are executed is switched from the order in which the difference detecting unit 130 and the block dividing unit 120 are executed in the first to fourth embodiments.

Figure 15:
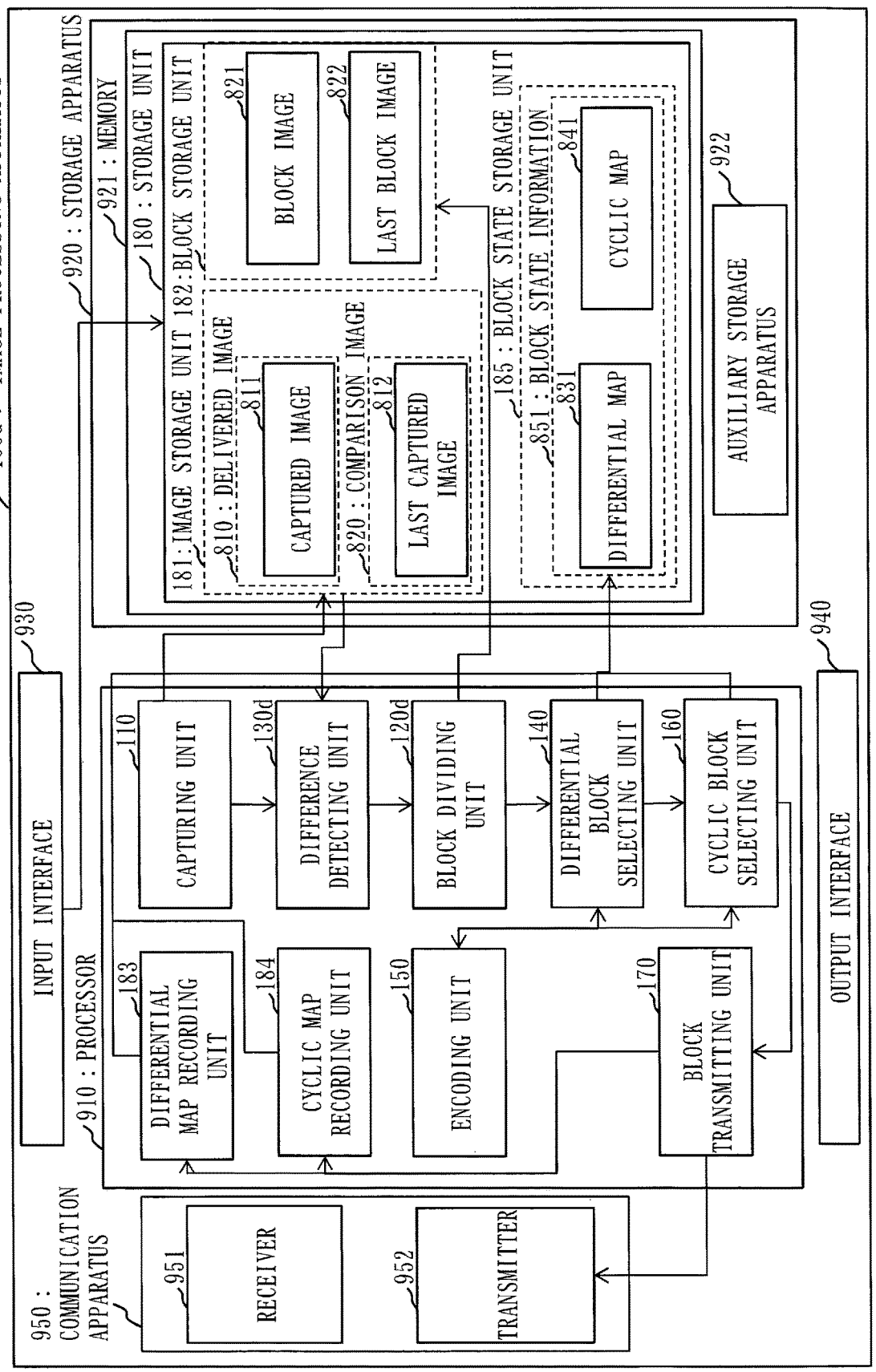
FIG. 15 is a configuration diagram of an image processing apparatus 100d according to a fifth embodiment.

A configuration of an image processing apparatus 100d according to the present embodiment will be described using FIG. 15. A difference in the image processing apparatus 100d according to the present embodiment from the image processing apparatus 100 of the embodiments is that the difference detecting unit 130d is executed and then the block dividing unit 120d is executed.

The difference detecting unit 130d reads a captured image 811 and a last captured image 812 from the image storage unit 181. The difference detecting unit 130d makes a comparison on a pixel-by-pixel basis to see whether there are differences between the read captured image 811 and last captured image 812. Then, the difference detecting unit 130d outputs differential pixel information indicating in which pixels the differences have occurred, to the block dividing unit 120d. At this time, the difference detecting unit 130d may also output the captured image 811 to the block dividing unit 120d.

The block dividing unit 120d receives the differential pixel information indicating in which pixels the differences have occurred from the difference detecting unit 130d, and divides the captured image 811 into a plurality of blocks. A division method is specified by the user or by a settings file, and division is performed once or more in a longitudinal direction and once or more in a transverse direction. In addition, at this time, it is also possible not to perform division in either of the longitudinal and transverse directions. After the division, the block dividing unit 120d determines for each block whether the block includes a pixel in which a difference has occurred. If there is a difference, the block dividing unit 120d writes a difference detected state 202 to the differential map 831 through the differential map recording unit 183. Then, the block dividing unit 120d stores the captured image 811 obtained this time and divided into blocks, as a block image 821, in the block storage unit 182.

Description of Operation

An image transmission process S100d according to the present embodiment will be described using FIG. 16.

Figure 16:
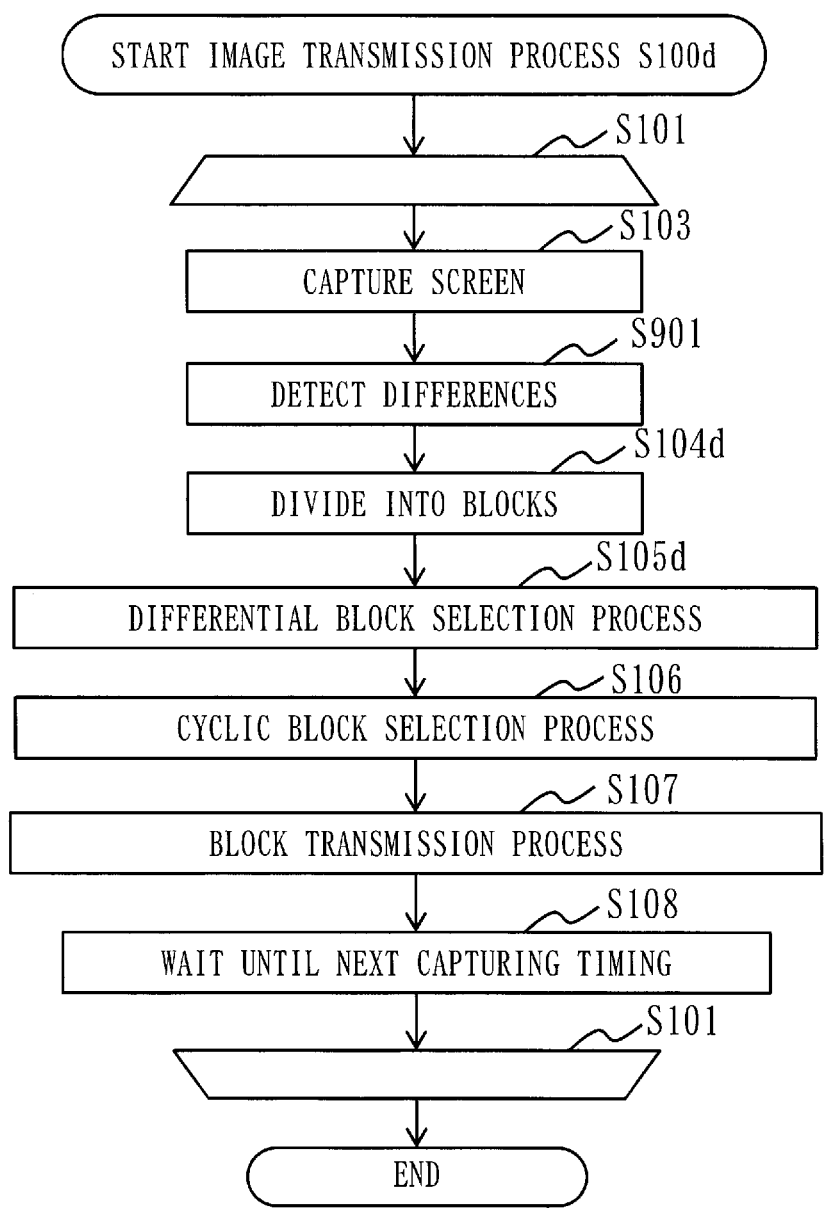
FIG. 16 is a flowchart illustrating an image transmission process S100d according to the fifth embodiment.

In the image transmission process S100d of FIG. 16, step S901 is added between step S103 and S104 of the image transmission process S100a described in FIG. 10. A process performed by the block dividing unit 120d at step S104d also differs from that of the second embodiment. In addition, a differential block selection process S105d also differs from that of the second embodiment and detection of differences on a block-by-block basis is not performed. Other operation is the same as that of the second embodiment.

At step S901, the difference detecting unit 130d compares a captured image 811 with a last captured image 812 on a pixel-by-pixel basis. The difference detecting unit 130d outputs differential pixel information indicating pixels having differences from the last captured image 812, to the block dividing unit 120d.

At step S104d, the block dividing unit 120d divides the captured image 811 into a plurality of blocks and detects, based on the differential pixel information, blocks including pixels having differences, as differential blocks.

In the differential block selection process S105d, the differential block selecting unit 140 selects one or more difference transmission scheduled blocks 2031 from the differential blocks detected by the block dividing unit 120*d*. A process of selecting one or more difference transmission scheduled blocks 2031 is the same as that described in the first embodiment.

Description of Advantageous Effects of the Present Embodiment

As described above, according to the image processing apparatus 100*d* according to the present embodiment, the same advantageous effects as those of the first and second embodiments can be obtained.

Sixth Embodiment

Description of Configurations

In this sixth embodiment, differences from the first embodiment will be mainly described.

In the present embodiment, the same configurations as those described in the first embodiment are denoted by the same reference signs and description thereof is omitted.

Description of Operation

Figure 18:
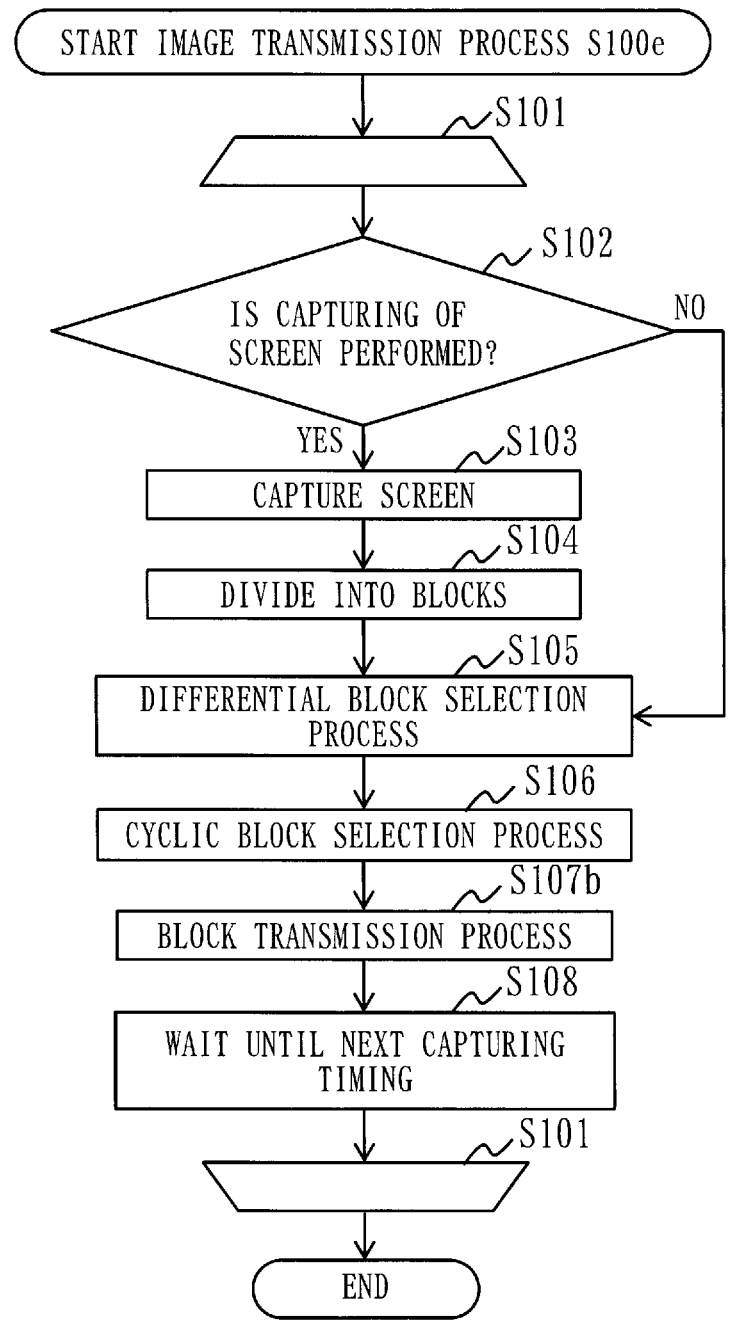
FIG. 18 is a flowchart illustrating an image transmission process S100e of an image processing method 510 and an image processing program 520 for an image processing apparatus 100e according to a sixth embodiment.

FIG. 18 is a diagram illustrating an image transmission process S100*e* of an image processing method 510 and an image processing program 520 for an image processing apparatus 100*e* according to the present embodiment.

In the first embodiment, at S102 of FIG. 4, when there is a block in a transmission scheduled state, i.e., the difference transmission scheduled state 203 or the cyclic transmission scheduled state 302, processing proceeds to S107.

In the present embodiment, as illustrated in FIG. 18, when there is a block in a transmission scheduled state, i.e., the difference transmission scheduled state 203, processing proceeds to S105. In addition, although in the first embodiment a process at S107 is performed, in the present embodiment a process at S107*b* illustrated in FIG. 11 is performed.

Here, specific examples of a differential block selection process S105 and a cyclic block selection process S106 which are present after the division of a screen in the present embodiment will be described using FIG. 19.

Figure 19:
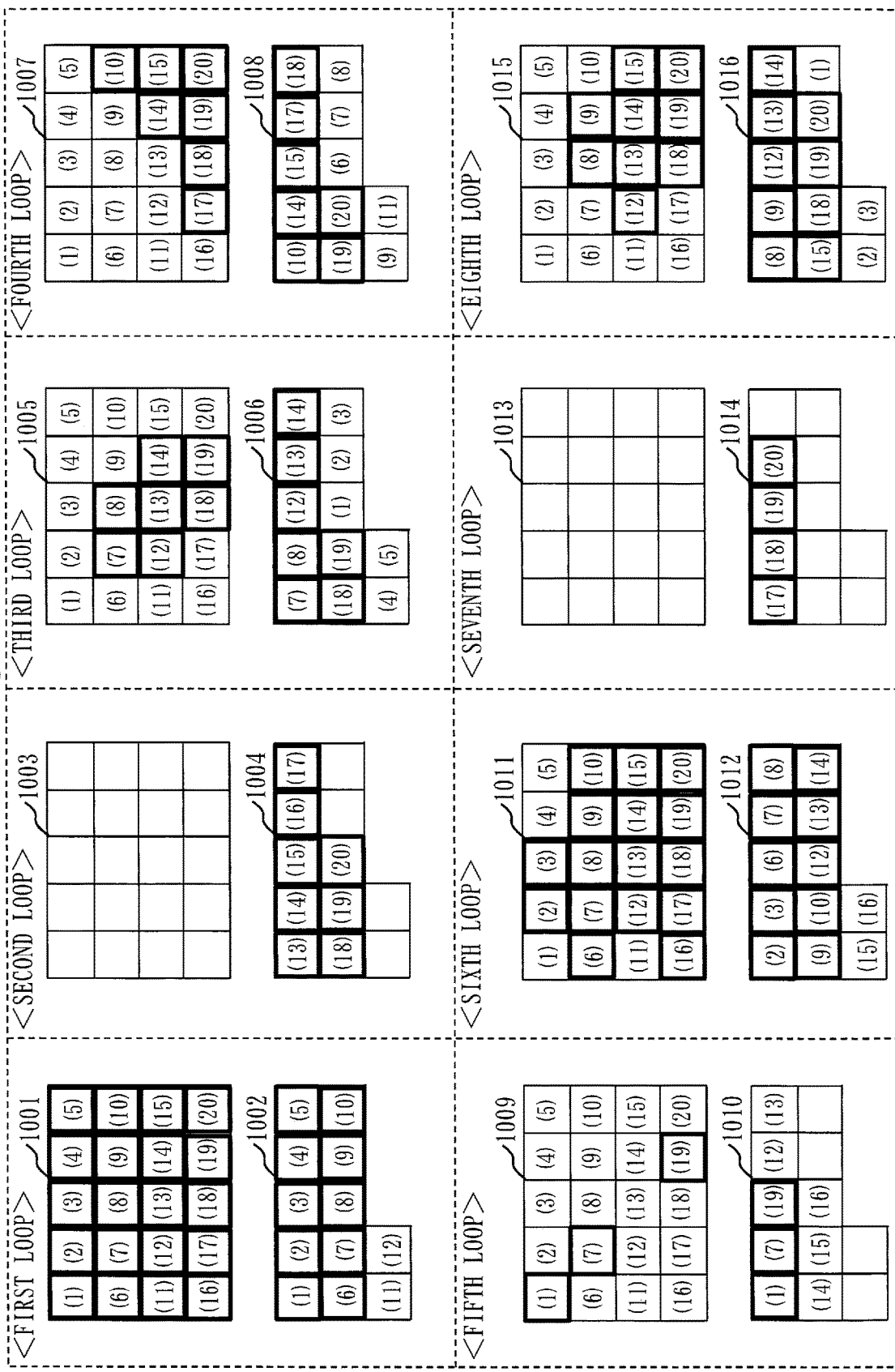
FIG. 19 is a diagram describing specific examples of a differential block selection process S105 and a cyclic block selection process S106 according to the sixth embodiment.

As preconditions of FIG. 19, the upper limit value X of blocks set to a difference transmission scheduled state is ten blocks, the lower limit value Y of blocks set to a cyclic transmission scheduled state is two blocks, and the upper limit value Z of blocks set to the cyclic transmission scheduled state is five blocks. In addition, for block number assignment, the numbers are assigned such that, with an upper left corner block being 1, the number increases by one in a row in a right direction, and when reaching a right end, the number increases again by one from the leftmost block in a row immediately below. 20 blocks are assigned (1) to (20).

1001, 1003, 1005, 1007, 1009, 1011, 1013, and 1015 of FIG. 19 represent data obtained after the completion of step S202 of FIG. 5, i.e., immediately after detection of differences. A block with all four sides enclosed by a thick line indicates that there is a difference. In addition, a block with at least one side having a thin line indicates that there is no difference.

For example, in 1001, (1) to (20) are blocks with four sides enclosed by a thick line, i.e., blocks having differences. In addition, in 1005, (7), (8), (12) to (14), (18), and (19) are blocks with four sides enclosed by a thick line, i.e., blocks having differences.

In addition, for example, in 1001, there are no blocks with at least one side having a thin line, i.e., no blocks having differences. On the other hand, in 1005, (1) to (6), (9) to (11), (15) to (17), and (20) are blocks with at least one side having a thin line, i.e., blocks having differences.

1002, 1004, 1006, 1008, 1010, 1012, 1014, and 1016 of FIG. 19 represent blocks set to the difference transmission scheduled state or blocks set to the cyclic transmission scheduled state. A block with all four sides enclosed by a thick line indicates a block set to the difference transmission scheduled state. In addition, a block with at least one side having a thin line indicates a block set to the cyclic transmission scheduled state.

For example, in 1002, (1) to (10) indicate blocks with four sides enclosed by a thick line, i.e., blocks set to the difference transmission scheduled state. In addition, in 1006, (7), (8), (12) to (14), (18), and (19) indicate blocks with four sides enclosed by a thick line, i.e., blocks set to the difference transmission scheduled state.

In addition, for example, in 1002, (11) and (12) indicate blocks with at least one side having a thin line, i.e., blocks set to the cyclic transmission scheduled state. In addition, in 1006, (1) to (5) indicate blocks with at least one side having a thin line, i.e., blocks set to the cyclic transmission scheduled state.

1001 and 1002 of FIG. 19 show the states of blocks for an initial loop, i.e., the first loop. Upon the initial loop, a last captured image 811 is not present, but in that case, the process continues, considering all blocks having differences. Hence, in 1001, all blocks have differences. In 1002, there are ten blocks set to the difference transmission scheduled state and two blocks set to the cyclic transmission scheduled state. In the block transmission process S107, all blocks in 1002 are transmitted and the initial loop ends.

1003 and 1004 of FIG. 19 show the states of blocks for the second loop. In the second loop, since blocks (13) to (20) that have not been able to be transmitted in the first loop remain, at the conditional determination at step S102 processing transitions to the block transmission process S107. In the block transmission process S107, (13) to (20) are transmitted.

1005 and 1006 of FIG. 19 show the states of blocks for the third loop. In the third loop, differences are detected in (7), (8), (12) to (14), (18), and (19). 1006 indicates that all of the above-described blocks in which the differences are detected are set to the difference transmission scheduled state as a result of performing the process of the differential block selection process S105. Furthermore, at step S305 of the cyclic block selection process S106, the transmitted states of cyclic blocks are cleared, and (1) to (5) are set to the cyclic transmission scheduled state.

1007 and 1008 of FIG. 19 show the states of blocks for the fourth loop. In the fourth loop, in 1007, differences are detected in seven blocks (10), (14), (15), and (17) to (20). Then, in 1007 the seven blocks (10), (14), (15), and (17) to (20) are set to the difference transmission scheduled state, and in 1008 five blocks (6) to (11) are set to the cyclic transmission scheduled state. Selection of blocks in the cyclic transmission scheduled state starts with a block subsequent to the block (5) that is set to the cyclic transmission scheduled state in the third loop.

1009 and 1010 of FIG. 19 show the states of blocks for the fifth loop. In the fifth loop, in 1009, differences are detected only in (1), (7), and (19). In 1010, (1), (7), and (19) are set to the difference transmission scheduled state, and (12) to (16) are set to the cyclic transmission scheduled state.

1011 and 1012 of FIG. 19 show the states of blocks for the sixth loop. In the sixth loop, in 1011, differences are detected in all blocks excluding (1), (4), (5), and (11). In 1012, there are ten blocks set to the difference transmission scheduled state and two blocks set to the cyclic transmission scheduled state.

1013 and 1014 of FIG. 19 show the states of blocks for the seventh loop. In the seventh loop, the blocks (17) to (20) that have not been able to be transmitted in the sixth loop are transmitted.

1015 and 1016 of FIG. 19 show the states of blocks for the eighth loop. In the eighth loop, in 1015, differences are detected in nine blocks. At step S305 of the cyclic block selection process S106, the transmitted states of cyclic blocks are cleared, and the blocks (1) to (3) are set to the cyclic transmission scheduled state.

The description of the specific examples of the differential block selection process S105 and the cyclic block selection process S106 of the present embodiment ends here.

Description of Advantageous Effects of the Present Embodiment

In the present embodiment, when transmission is discontinued at S107b, it becomes possible to choose differential blocks and cyclic blocks again. By this, more differential blocks and more cyclic blocks can be transmitted over the first embodiment.

Seventh Embodiment

Description of Configurations

In this seventh embodiment, a difference from the first embodiment will be mainly described.

In the present embodiment, the same configurations as those described in the first embodiment are denoted by the same reference signs and description thereof is omitted.

Description of Operation

A cyclic block selection process S106f according to the present embodiment will be described using FIG. 20.

In the first embodiment, in the cyclic block selection process S106 of FIG. 6, blocks set to the cyclic transmission scheduled state are chosen again at step S306 and S307.

Figure 20:
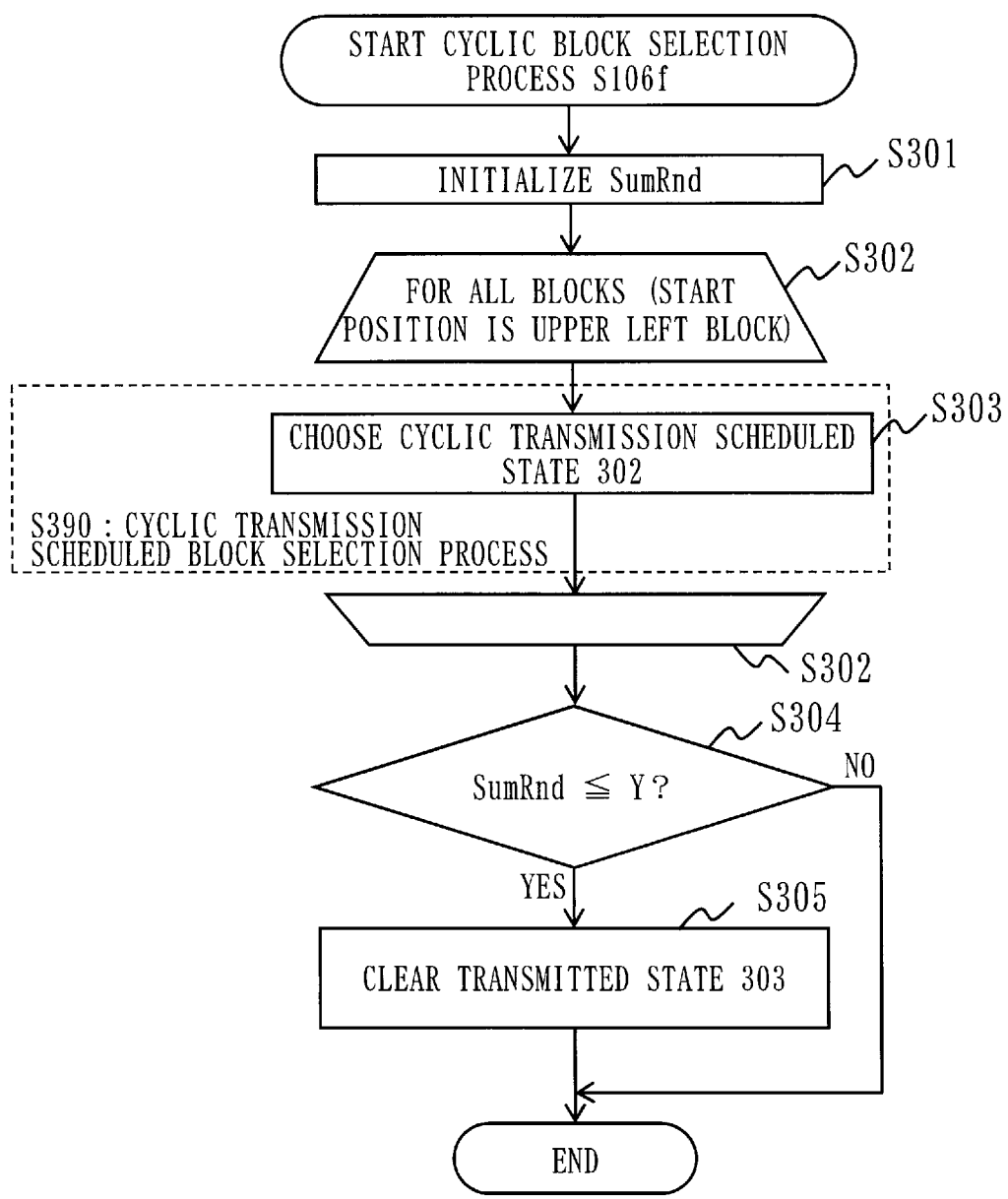
FIG. 20 is a flowchart of a cyclic block selection process S106f according to a seventh embodiment.

In the present embodiment, as illustrated in FIG. 20, processes at step S306 and S307 are not performed.

Description of Advantageous Effects of the Present Embodiment

According to the present embodiment, blocks set to the cyclic transmission scheduled state are not chosen again at step S306 and S307, by which retransmission of blocks having been transmitted once is performed in the next or subsequent loop. By this, the amount of blocks in the cyclic transmission scheduled state to be transmitted can be reduced, enabling to save network bandwidth.

The description of the first to seventh embodiments ends here. Note that of these first to seventh embodiments, a plurality of embodiments may be partially combined and implemented. Alternatively, of these first to seventh embodiments, one embodiment may be partially implemented. Alternatively, a part of each of these first to seventh embodiments may be partially combined and implemented. In addition, these first to seventh embodiments may be, as a whole or partially, combined and implemented in any manner.

In the above-described first to seventh embodiments, an image processing apparatus is configured such that each of the "units" is an independent functional block. However, the configuration does not need to be the one described above, and the configuration of the image processing apparatus is any. The functional blocks of the image processing apparatus are any as long as the functions described in the above-described first to seventh embodiments can be implemented. The image processing apparatus may be configured by any other combination of these functional blocks or by any block configuration.

In addition, the image processing apparatus may be a system including a plurality of apparatuses, instead of being a single apparatus.

In addition, only any one of those described as the "units" in the description of the first to seventh embodiments may be adopted, or any combination of some of them may be adopted. That is, the functional configuration of the image processing apparatus is any as long as the functions described in the above-described first to seventh embodiments can be implemented. The functional configuration may be formed by any combination or any functional configuration.

Note that the above-described first to seventh embodiments are essentially preferred exemplification and are not intended to limit the scope of the present invention, objects to which the present invention is applied, or applications, and various changes may be made thereto as necessary.

REFERENCE SIGNS LIST 100, 100c, 100d: image processing apparatus; 110: capturing unit; 120, 120d: block dividing unit; 130, 130d: difference detecting unit; 140: differential block selecting unit; 150: encoding unit; 160: cyclic block selecting unit; 170: block transmitting unit; 181: image storage unit; 182: block storage unit; 183: differential map recording unit; 184: cyclic map recording unit; 180: storage unit; 185: block state storage unit; 201: normal state; 202: difference detected state; 203: difference transmission scheduled state; 301: untransmitted state; 302: cyclic transmission scheduled state; 303: transmitted state; 510: image processing method; 520: image processing program; 811: captured image; 812: last captured image; 821: block image; 822: last block image; 851: block state information; 831: differential map; 841: cyclic map; 810: delivered image; 820: comparison image; 821b: encoded block image; 822b: encoded last block image; 909: processing circuit; 910: processor; 920: storage apparatus; 930: input interface; 940: output interface; 950: communication apparatus; 951: receiver; 952: transmitter; 921: memory; 922: auxiliary storage apparatus; 1401: difference encoded block; 1601: cyclic encoded block; 2031: difference transmission scheduled block; 3021: cyclic transmission scheduled block; S100, S100a, S100c, S100d, S100e: image transmission process; S105, S105c, S105d: differential block selection process; S106, S106f: cyclic block selection process; S107, S107b: block transmission process; S390, S390c: cyclic transmission scheduled block selection process; X: difference threshold; Y: lower limit value; Z: upper limit value.

The invention claimed is:

1. An image processing apparatus comprising:
processing circuitry to compare a delivered image divided into a plurality of blocks with a comparison image on a block-by-block basis to detect blocks having differences from the comparison image, as differential blocks, from the plurality of blocks, the delivered image being delivered among a plurality of images that are sequentially delivered, and the comparison image being compared with the delivered image among the plurality of images, to select one or more blocks for encoding and transmission, as one or more difference transmission scheduled blocks, from the differential blocks, and to select one or more blocks for encoding and transmission, as one or more cyclic transmission scheduled blocks, from cyclic blocks, the cyclic blocks being blocks other than the one or more difference transmission scheduled blocks among the plurality of blocks, a total value of amounts of code used to encode the respective one or more cyclic transmission scheduled blocks being in a range of a lower limit value and an upper limit value, wherein the processing circuitry selects the one or more difference transmission scheduled blocks from the differential blocks, a total value of amounts of code used to encode the respective one or more difference transmission scheduled blocks not exceeding a difference threshold wherein the processing circuitry encodes the one or more difference transmission scheduled blocks and the one or more cyclic transmission scheduled blocks, as one or more difference encoded blocks and one or more cyclic encoded blocks, and performs a transmission process for transmitting the one or more difference encoded blocks and the one or more cyclic encoded blocks encoded by the processing circuitry.

2. The image processing apparatus according to claim 1, wherein the processing circuitry outputs the differential blocks, obtains encoded differential blocks and data sizes of the respective encoded differential blocks, and selects the one or more difference transmission scheduled blocks based on the data sizes of the respective encoded differential blocks, the encoded differential blocks being the differential blocks having been encoded, and outputs the cyclic blocks, obtains encoded cyclic blocks and data sizes of the respective encoded cyclic blocks, and selects the one or more cyclic transmission scheduled blocks based on the data sizes of the respective encoded cyclic blocks, the encoded cyclic blocks being the cyclic blocks having been encoded.

3. The image processing apparatus according to claim 1, wherein the processing circuitry can transmit the one or more difference encoded blocks and the one or more cyclic encoded blocks in the transmission process, amounts of code of the one or more difference encoded blocks and the one or more cyclic encoded blocks being up to an amount-of-code threshold, and a value obtained by adding together the difference threshold and the upper limit value is less than or equal to the amount-of-code threshold.

4. The image processing apparatus according to claim 1, wherein the processing circuitry stores block state information in which states of the respective plurality of blocks are recorded, and records a state of each of the one or more difference encoded blocks and each of the one or more cyclic encoded blocks, as a transmitted state, in the block state information.

5. The image processing apparatus according to claim 4, wherein the processing circuitry creates the delivered image by capturing a screen, divides the delivered image created into the plurality of clocks, outputs each of the plurality of blocks, obtains pieces of encoded data and data sizes of the respective pieces of encoded data, and stores the pieces of encoded data and the data sizes of the respective pieces of encoded data, the pieces of encoded data being the plurality of blocks having been encoded, respectively, and obtains the pieces of encoded data and the data sizes of the respective pieces of encoded data, and selects the one or more difference transmission scheduled blocks based on the data sizes of the respective pieces of encoded data.

6. The image processing apparatus according to claim 5, wherein the processing circuitry creates an image subsequent to the delivered image among the plurality of images after completion of the transmission process.

7. The image processing apparatus according to claim 6, wherein the processing circuitry has, as the block state information, a differential map in which states of the differential blocks are recorded and a cyclic map in which states of the cyclic blocks are recorded, records, when the one or more difference transmission scheduled blocks are selected, a state of each of the one or more difference transmission scheduled blocks as a difference transmission scheduled state in the differential map, and records, when the one or more cyclic transmission scheduled blocks are selected, a state of each of the one or more cyclic transmission scheduled blocks as a cyclic transmission scheduled state in the cyclic map.

8. The image processing apparatus according to claim 7, wherein the processing circuitry determines during the performing of the transmission process whether to continue the transmission process, and discontinues the transmission process when it is determined not to continue the transmission process.

9. The image processing apparatus according to claim 8, wherein the processing circuitry determines based on the differential map and the cyclic map whether the differential map and the cyclic map have a block in the difference transmission scheduled state or the cyclic transmission scheduled state, and outputs, when the differential map and the cyclic map have a block in the difference transmission scheduled state or the cyclic transmission scheduled state, an instruction to transmit the block in the difference transmission scheduled state or the cyclic transmission scheduled state, without performing capturing.

10. An image processing apparatus comprising:

processing circuitry to compare a delivered image with a comparison image on a pixel-by-pixel basis to output differential pixel information indicating pixels having differences from the comparison image, the delivered image being delivered among a plurality of images to that are sequentially delivered, and the comparison image being compared with the delivered image among the plurality of images, to divide the delivered image into a plurality of blocks and detect, based on the differential pixel information, blocks including the pixels having differences, as differential blocks, to select one or more blocks for encoding and transmission, as one or more difference transmission scheduled blocks, from the differential blocks, and to select one or more blocks for encoding and transmission, as one or more cyclic transmission scheduled blocks, from cyclic blocks, the cyclic blocks being blocks other than the one or more difference transmission scheduled blocks among the plurality of blocks, a total value of amounts of code used to encode the respective one or more cyclic transmission scheduled blocks being in a range of a lower limit value and an upper limit value, wherein the processing circuitry selects the one or more difference transmission scheduled blocks from the differential blocks, a total value of amounts of code used to encode the respective one or more difference transmission scheduled blocks not exceeding a difference threshold wherein the processing circuitry encodes the one or more difference transmission scheduled blocks and the one or more cyclic transmission scheduled blocks, as one or more difference encoded blocks and one or more cyclic encoded blocks, and performs a transmission process for transmitting the one or more difference encoded blocks and the one or more cyclic encoded blocks encoded by the processing circuitry.

11. An image processing method comprising:

comparing a delivered image divided into a plurality of blocks with a comparison image on a block-by-block basis to detect blocks having differences from the comparison image, as differential blocks, from the plurality of blocks, the delivered image being delivered among a plurality of images that are sequentially delivered, and the comparison image being compared with the delivered image among the plurality of images;

selecting one or more blocks for encoding and transmission, as one or more difference transmission scheduled blocks, from the differential blocks, a total value of amounts of code used to encode the respective one or more difference transmission scheduled blocks not exceeding a difference threshold; and selecting one or more blocks for encoding and transmission, as one or more cyclic transmission scheduled blocks, from cyclic blocks, the cyclic blocks being blocks other than the one or more difference transmission scheduled blocks among the plurality of blocks, a total value of amounts of code used to encode the respective one or more cyclic transmission scheduled blocks being in a range of a lower limit value and an upper limit value wherein the method further comprises encoding the one or more difference transmission scheduled blocks and the one or more cyclic transmission scheduled blocks, as one or more difference encoded blocks and one or more cyclic encoded blocks, and performing a transmission process for transmitting the one or more difference encoded blocks and the one or more cyclic encoded blocks.

12. A non-transitory computer-readable recording medium storing an image processing program causing a computer to perform:

a differential block selection process for comparing a delivered image divided into a plurality of blocks with a comparison image on a block-by-block basis to detect blocks having differences from the comparison image, as differential blocks, from the plurality of blocks and selecting one or more blocks for encoding and transmission, as one or more difference transmission scheduled blocks, from the differential blocks, the delivered image being delivered among a plurality of images that are sequentially delivered, and the comparison image being compared with the delivered image among the plurality of images; and a cyclic block selection process for selecting one or more blocks for encoding and transmission, as one or more cyclic transmission scheduled blocks, from cyclic blocks, the cyclic blocks being blocks other than the one or more difference transmission scheduled blocks among the plurality of blocks, a total value of amounts of code used to encode the respective one or more cyclic transmission scheduled blocks being in a range of a lower limit value and an upper limit value, wherein the differential block selection process includes selecting the one or more difference transmission scheduled blocks from the differential blocks, a total value of amounts of code used to encode the respective one or more difference transmission scheduled blocks not exceeding a difference threshold wherein the computer encodes the one or more difference transmission scheduled blocks and the one or more cyclic transmission scheduled blocks, as one or more difference encoded blocks and one or more cyclic encoded blocks, and performs a transmission process for transmitting the one or more difference encoded blocks and the one or more cyclic encoded blocks.

* * * * *